(12) United States Patent
Lee et al.

(10) Patent No.: US 12,342,369 B2
(45) Date of Patent: Jun. 24, 2025

(54) METHOD AND DEVICE FOR SELECTING PSFCH RESOURCE IN NR V2X

(71) Applicant: LG ELECTRONICS INC., Seoul (KR)

(72) Inventors: Seungmin Lee, Seoul (KR); Hanbyul Seo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

(21) Appl. No.: 17/767,037

(22) PCT Filed: Oct. 7, 2020

(86) PCT No.: PCT/KR2020/013638
§ 371 (c)(1),
(2) Date: Apr. 6, 2022

(87) PCT Pub. No.: WO2021/071234
PCT Pub. Date: Apr. 15, 2021

(65) Prior Publication Data
US 2022/0377761 A1 Nov. 24, 2022

Related U.S. Application Data

(60) Provisional application No. 62/923,443, filed on Oct. 18, 2019, provisional application No. 62/912,028, filed on Oct. 7, 2019.

(51) Int. Cl.
*H04W 72/20* (2023.01)
*H04W 72/566* (2023.01)

(52) U.S. Cl.
CPC ......... *H04W 72/569* (2023.01); *H04W 72/20* (2023.01)

(58) Field of Classification Search
CPC ......... H04W 72/1268; H04W 74/0841; H04W 74/0866; H04W 84/06; H04W 74/0833;
(Continued)

(56) References Cited

U.S. PATENT DOCUMENTS 11,178,578 B2 * 11/2021 Huang ............... H04W 72/0446
11,968,667 B2 * 4/2024 Zhang ..................... H04W 72/20
(Continued)

FOREIGN PATENT DOCUMENTS

EP       4080956 A1 * 10/2022 ........... H04L 1/1854
EP       4152801 A1 *  3/2023 ........... H04L 1/1854
(Continued)

OTHER PUBLICATIONS

Intel Corporation, "NR V2X Sidelink Physical Layer Procedures", R1-1908638, 3GPP TSG RAN WG1 Meeting #98, Prague, Czech Republic, Aug. 26-30, 2019, see sections 2.1 and 2.2.4.
(Continued)

*Primary Examiner* — Nathan S Taylor
(74) *Attorney, Agent, or Firm* — BRYAN CAVE LEIGHTON PAISNER LLP

(57) ABSTRACT

A method by which a first device performs wireless communication is presented. The method can comprise the steps of: receiving a plurality of first physical sidelink control channels (PSCCHs); receiving a plurality of first physical sidelink shared channels (PSSCHs) related to the plurality of first PSCCHs; transmitting a plurality of second PSCCHs; transmitting a plurality of second PSSCHs related to the plurality of second PSCCHs; and performing any one related to a high priority from among the transmission of a plurality of first physical sidelink feedback channels (PSFCHs) and the reception of a plurality of second PSFCHs on the basis of a first priority of the transmission of a plurality of first PSFCHs related to the reception of the plurality of first
(Continued)

PSSCHs and a second priority of the reception of a plurality of second PSFCHs related to the transmission of the plurality of second PSSCHs. For example: the first priority can be the highest priority from among a plurality of priorities related to the transmission of the plurality of first PSFCHs; the second priority can be the highest priority from among a plurality of priorities related to the reception of the plurality of second PSFCHs; and the transmission of the plurality of first PSFCHs and the reception of the plurality of second PSFCHs can overlap on a time domain.

15 Claims, 24 Drawing Sheets

(58) Field of Classification Search
CPC ... H04W 72/12; H04W 74/08; H04W 52/146; H04W 52/241; H04W 52/367; H04W 52/243; H04W 52/262; H04W 52/283; H04W 52/34; H04W 52/346; H04W 52/38; H04W 52/40; H04W 88/10; H04W 52/14; H04W 52/24; H04W 52/36; H04W 52/26; H04W 52/28; H04W 52/42; H04W 72/20; H04W 72/0446; H04W 76/14; H04W 72/56; H04W 72/23; H04W 4/46; H04W 72/1263; H04W 76/27; H04W 52/383; H04W 52/281005; H04W 72/04; H04W 72/40; H04W 72/51; H04W 28/0268; H04W 28/305; H04W 4/30; H04W 4/14; H04W 52/0219; H04W 52/028; H04W 52/325; H04W 52/520015; H04W 68/025; H04W 72/0473; H04W 72/232; H04W 72/542; H04W 72/543004; H04W 74/0808; H04W 76/15; H04W 76/18; H04W 84/005; H04W 84/047; H04W 88/08; H04W 72/02; H04W 72/25; H04W 76/28; H04W 52/02; H04W 24/10; H04W 28/02; H04W 4/06; H04W 52/52; H04L 1/0003; H04L 1/0009; H04L 1/00; H04L 5/0055; H04L 1/1854; H04L 1/1861; H04L 1/1896; H04L 1/1864; H04L 5/0048; H04L 2001/0093; H04L 5/0064; H04L 5/2602; H04L 5/0091; H04L 5/08; H04L 1/1607; H04L 1/1848; H04L 1/1887; H04L 1/0042; H04L 5/0057; H04L 5/0026; H04L 1/0031; H04L 1/0067; H04L 1/0068; H04L 1/1825; H04L 1/1874; H04L 12/2869; H04L 27/2601; H04L 27/261; H04L 27/2613; H04L 47/76; H04L 47/826; H04L 5/0012; H04L 5/0035; H04L 5/0037; H04L 5/0083; H04L 5/0085; H04L 5/1469; H04L 5/16; G01S 1/042
See application file for complete search history.

(56) References Cited

U.S. PATENT DOCUMENTS

| | | | | |
|---|---|---|---|---|
| 2020/0029318 A1* | 1/2020 | Guo | | H04L 1/1822 |
| 2020/0196255 A1* | 6/2020 | Cheng | | H04L 5/0064 |
| 2020/0205165 A1* | 6/2020 | Huang | | H04L 1/1854 |
| 2020/0205166 A1* | 6/2020 | Huang | | H04W 76/27 |
| 2020/0322024 A1* | 10/2020 | Cheng | | H04W 76/11 |
| 2021/0022127 A1* | 1/2021 | Xu | | H04W 72/20 |
| 2021/0028842 A1* | 1/2021 | Kim | | H04B 7/0628 |
| 2021/0028910 A1* | 1/2021 | Cheng | | H04L 1/1854 |
| 2021/0099261 A1* | 4/2021 | Baghel | | H04L 1/1854 |
| 2021/0105126 A1* | 4/2021 | Yi | | H04L 1/1671 |
| 2021/0105790 A1* | 4/2021 | Lin | | H04W 72/56 |
| 2021/0127383 A1* | 4/2021 | Hui | | H04L 1/1864 |
| 2021/0168762 A1* | 6/2021 | Huang | | H04L 1/1864 |
| 2021/0195610 A1* | 6/2021 | Wang | | H04L 1/1854 |
| 2021/0219262 A1* | 7/2021 | Balasubramanian | | H04W 68/005 |
| 2021/0227604 A1* | 7/2021 | Huang | | H04W 72/20 |
| 2021/0314966 A1* | 10/2021 | Hui | | H04W 72/56 |
| 2021/0329568 A1* | 10/2021 | Zhang | | H04W 4/70 |
| 2021/0377931 A1* | 12/2021 | Zhang | | H04W 72/20 |
| 2021/0400681 A1* | 12/2021 | Wang | | H04W 72/0453 |
| 2022/0030493 A1* | 1/2022 | Hong | | H04L 1/1896 |
| 2022/0030613 A1* | 1/2022 | Wang | | H04L 1/1864 |
| 2022/0053495 A1* | 2/2022 | Huang | | H04L 5/0055 |
| 2022/0086860 A1* | 3/2022 | Panteleev | | H04W 4/40 |
| 2022/0110069 A1* | 4/2022 | Wang | | H04W 52/281 |
| 2022/0124729 A1* | 4/2022 | Ji | | H04L 1/1861 |
| 2022/0132471 A1* | 4/2022 | Hwang | | H04W 72/20 |
| 2022/0174720 A1* | 6/2022 | Yang | | H04W 72/23 |
| 2022/0201654 A1* | 6/2022 | Lee | | H04L 1/1864 |
| 2022/0256535 A1* | 8/2022 | Horiuchi | | H04L 5/0033 |
| 2022/0279504 A1* | 9/2022 | Ko | | H04W 72/21 |
| 2022/0295504 A1* | 9/2022 | Lee | | H04L 1/1887 |
| 2022/0304001 A1* | 9/2022 | Lee | | H04W 72/0446 |
| 2022/0321278 A1* | 10/2022 | Yoshioka | | H04L 1/1854 |
| 2022/0330266 A1* | 10/2022 | Huang | | H04W 72/56 |
| 2022/0346066 A1* | 10/2022 | Liu | | H04L 1/1861 |
| 2022/0353035 A1* | 11/2022 | Ko | | H04L 5/0048 |
| 2022/0376831 A1* | 11/2022 | Yoshioka | | H04W 72/02 |
| 2022/0394702 A1* | 12/2022 | Lee | | H04L 1/1812 |
| 2023/0007628 A1* | 1/2023 | Yoshioka | | H04L 1/1896 |
| 2023/0057836 A1* | 2/2023 | Yeo | | H04L 1/1887 |
| 2023/0069535 A1* | 3/2023 | Luo | | H04W 72/1263 |
| 2023/0107528 A1* | 4/2023 | Liu | | H04L 5/0053 370/329 |
| 2023/0111483 A1* | 4/2023 | Hong | | H04L 5/0044 705/329 |
| 2023/0115633 A1* | 4/2023 | Park | | H04W 72/232 370/311 |
| 2023/0189370 A1* | 6/2023 | Park | | H04L 1/1854 370/329 |
| 2023/0254069 A1* | 8/2023 | Lee | | H04L 1/0025 370/252 |
| 2023/0284241 A1* | 9/2023 | He | | H04W 72/02 370/328 |
| 2024/0015656 A1* | 1/2024 | Do | | H04W 76/28 |
| 2024/0057122 A1* | 2/2024 | Lee | | H04W 52/0229 |

FOREIGN PATENT DOCUMENTS

| | | | | |
|---|---|---|---|---|
| EP | 4240075 A1 * | 9/2023 | ......... | H04W 72/02 |
| EP | 4246862 A2 * | 9/2023 | ......... | H04L 1/0007 |
| WO | 2019/151915 A1 | 8/2019 | | |
| WO | WO-2021067753 A1 * | 4/2021 | ......... | H04L 1/1812 |

OTHER PUBLICATIONS

ZTE et al., "In-device coexistence between NR V2X and LTE V2X", R1-1910281, 3GPP TSG RAN WG1 #98bis, Chongqing, China, Oct. 14-20, 2019, see sections 2.3-2.4.

Futurewei, "On Simultaneous Transmission of PSFCH", R4-1912306, 3GPP TSG RAN WG4 Meeting #92-Bis, Chongqing, China, Oct. 14-18, 2019, see sections 2 and 2.1.

Xiaomi Communications, "On Procedures for 5G V2x communications", R1-1911291, 3GPP TSG RAN WG1 #98bis, Chongqing, China, Oct. 14-20, 2019, see sections 1 and 3.

TCL Communication "Physical Layer Procedures for Sidelink," 3GPP TSG RAN WG1 Meeting #98, R1-1908279, 14 pages, Aug. 2019.

Oppo "Physical layer procedure for NR-V2X sidelink," 3GPP TSG RAN WG1 #98, R1-1908364, 13 pages, Aug. 2019.

FutureWei "Views on physical layer procedures for sidelink," 3GPP TSG RAN WG1 Meeting #98, R1-1908741, 6 pages, Aug. 2019.

(56) References Cited

OTHER PUBLICATIONS

LG Electronic "Discussion on physical layer procedures for NR sidelink," 3GPP TSG RAN WG1 Meeting #98, R1-1908906, 19 pages, Aug. 2019.

* cited by examiner

FIG. 4
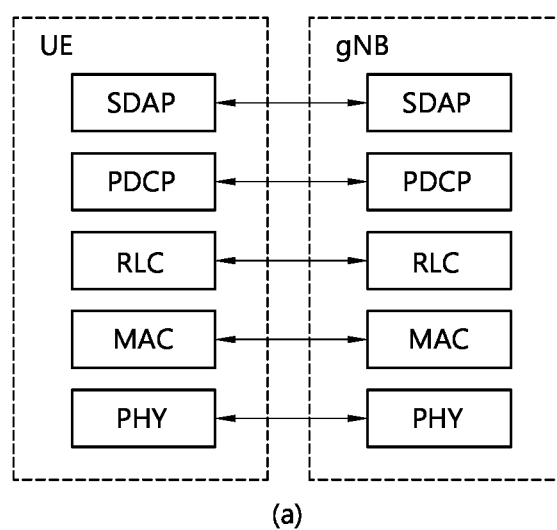
(a)
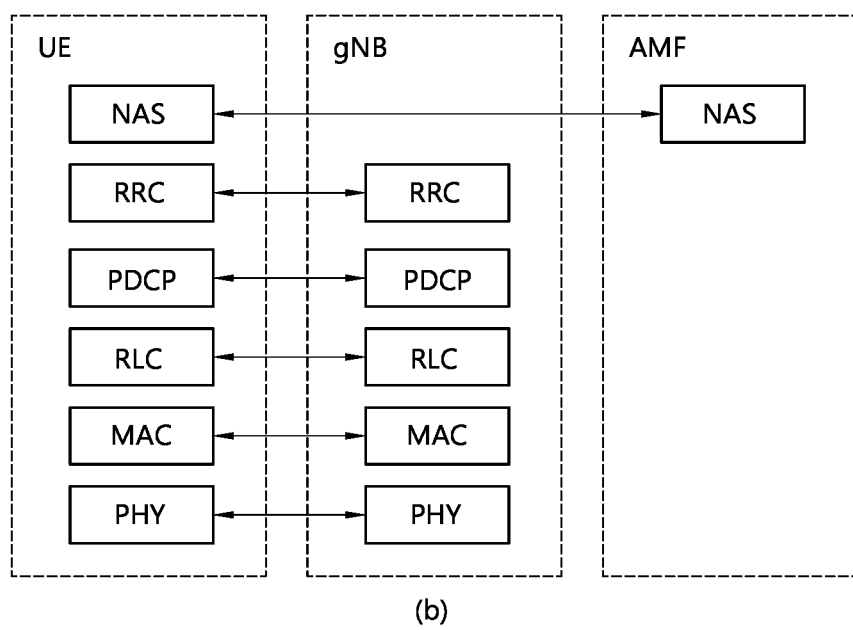
(b)

FIG. 8
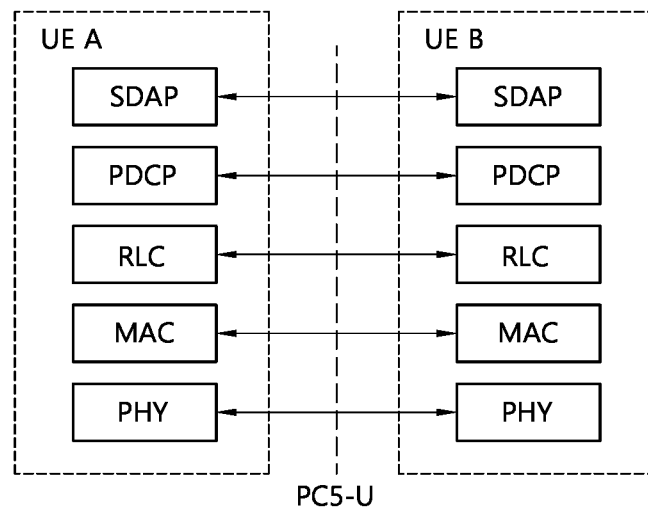
(a)
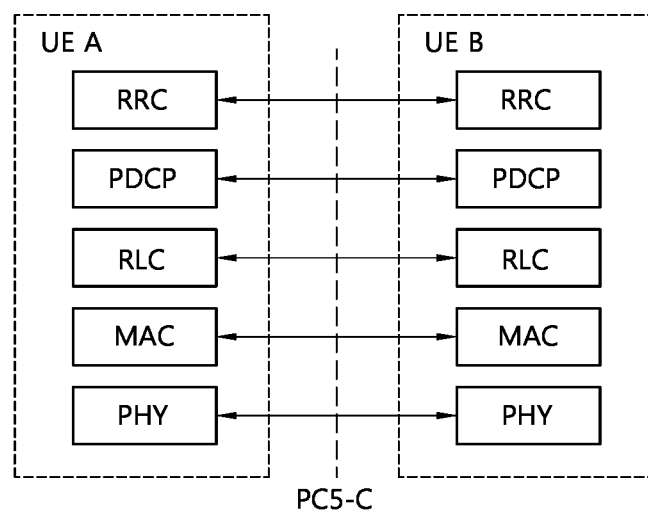
(b)

METHOD AND DEVICE FOR SELECTING PSFCH RESOURCE IN NR V2X

This application is the National Stage filing under 35 U.S.C. 371 of International Application No. PCT/KR2020/013638, filed on Oct. 7, 2020, which claims the benefit of and priority to U.S. Provisional Application No. 62/912,028, filed on Oct. 7, 2019 and U.S. Provisional Application No. 62/923,443, filed on Oct. 18, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in NR V2X, transmission of a plurality of physical sidelink feedback channel (PSFCH) and reception of a plurality of PSFCHs may overlap at the same time point of a UE. In this case, for example, a criterion for omitting any one of transmissions of a plurality of PSFCHs and receptions of a plurality of PSFCHs by a UE may be required.

In addition, when a UE transmits a plurality of PSFCHs at the same time, for example, the transmit power difference between PSFCHs may be relatively large, and/or the separation distance in the frequency domain between PSFCHs may be large, and/or the number of PSFCHs for which simultaneous transmission is required may be large. Because of this, a problem that the peak-to-average power ratio (PAPR) characteristic deteriorates, a problem that the error vector magnitude (EVM) performance deteriorates, a problem that the spectral emission performance deteriorates, or a problem that the required Maximum Power Reduction (MPR) value increases may occur.

Technical Solutions

In an embodiment, a method for a first apparatus to perform wireless communication is proposed. The method may include: receiving a plurality of first physical sidelink control channels (PSCCHs); receiving a plurality of first physical sidelink shared channels (PSSCHs) related to the plurality of first PSCCHs; transmitting a plurality of second PSCCHs; transmitting a plurality of second PSSCHs related to the plurality of second PSCCHs; and based on a first priority of transmissions of a plurality of first physical sidelink feedback channels (PSFCHs) related to the receptions of the plurality of first PSSCHs and a second priority of receptions of a plurality of second PSFCHs related to the transmissions of the plurality of second PSSCHs, performing any one related to a higher priority, of the transmissions of the plurality of first PSFCHs or the receptions of the plurality of second PSFCHs. For example, the first priority may be the highest priority among a plurality of priorities related to the transmissions of the plurality of first PSFCHs. For example, the second priority may be the highest priority among a plurality of priorities related to the receptions of the plurality of second PSFCHs. For example, the transmissions of the plurality of first PSFCHs and the receptions of the plurality of second PSFCHs may overlap in the time domain.

Effects of the Disclosure

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
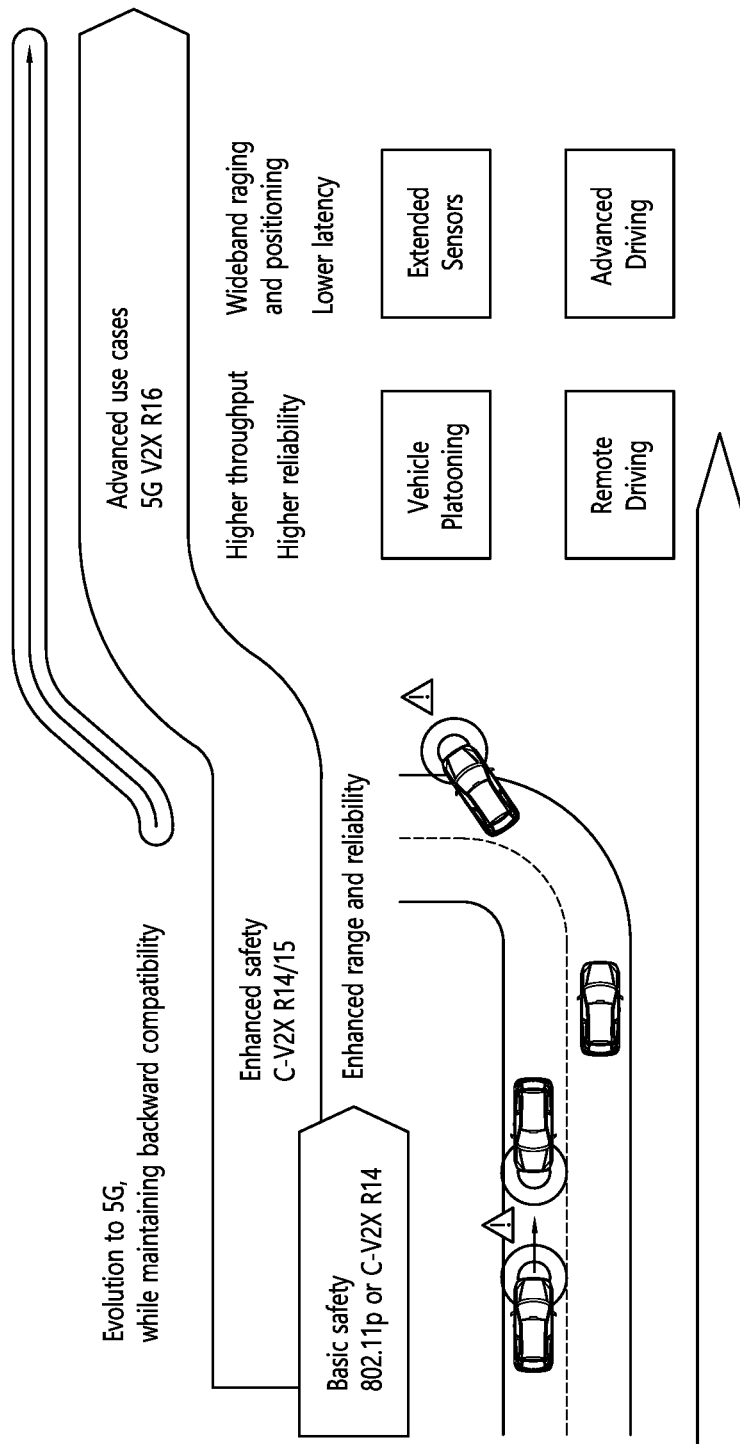
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
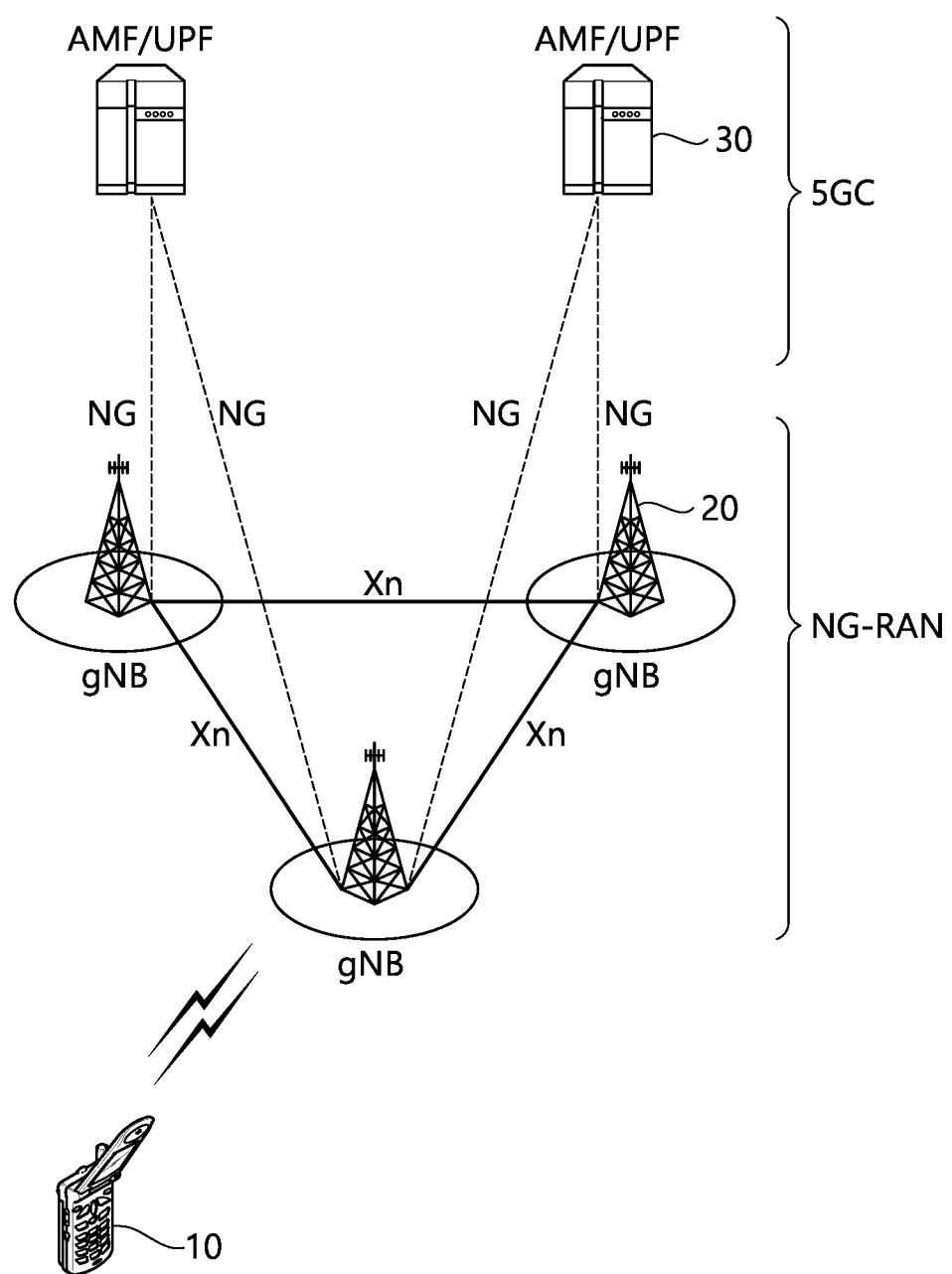
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
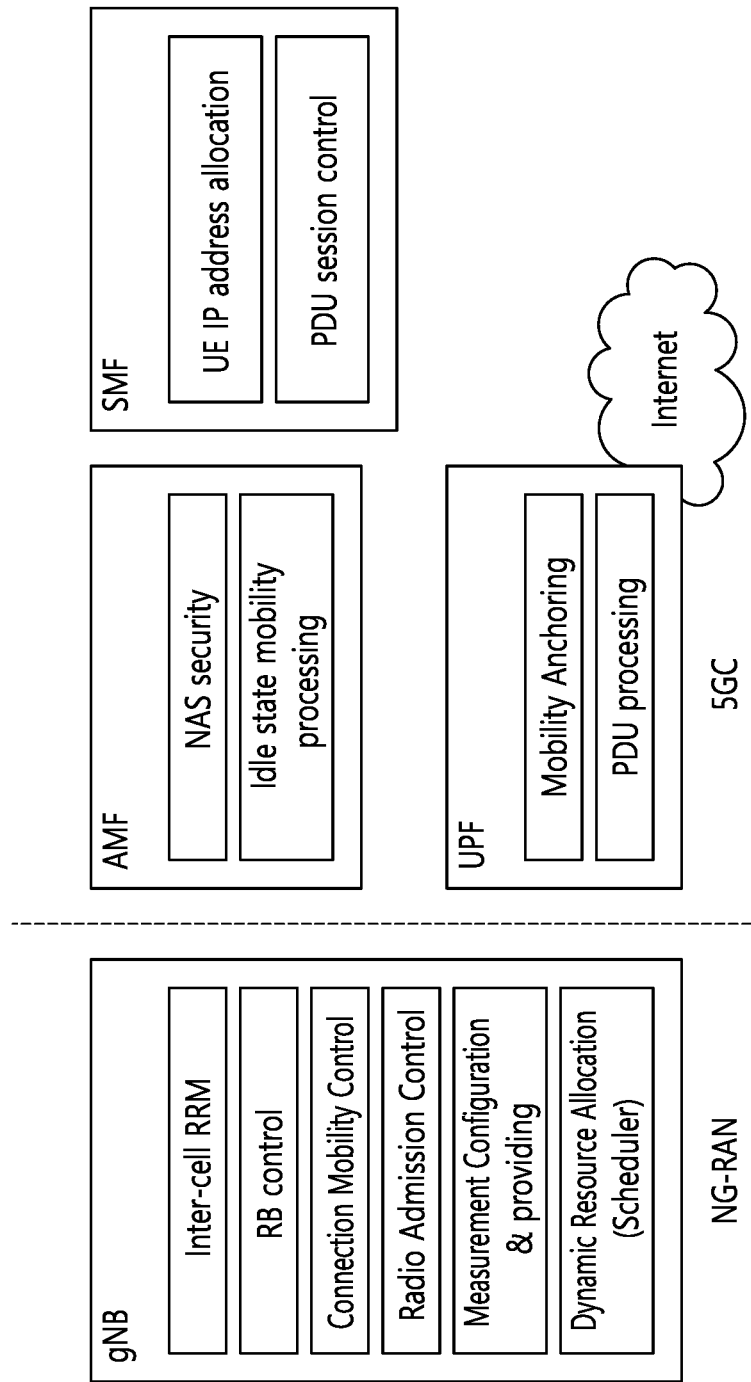
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
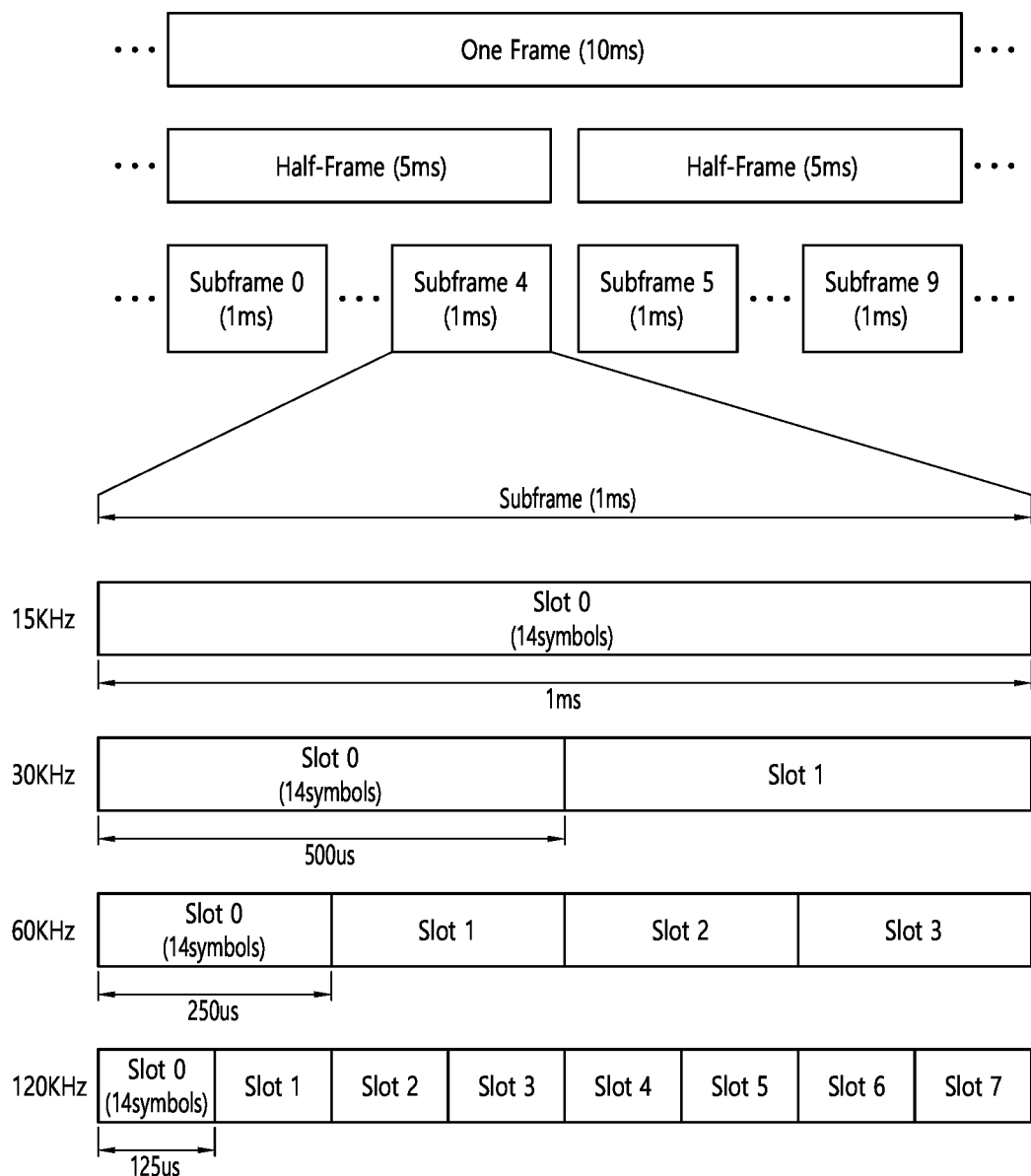
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
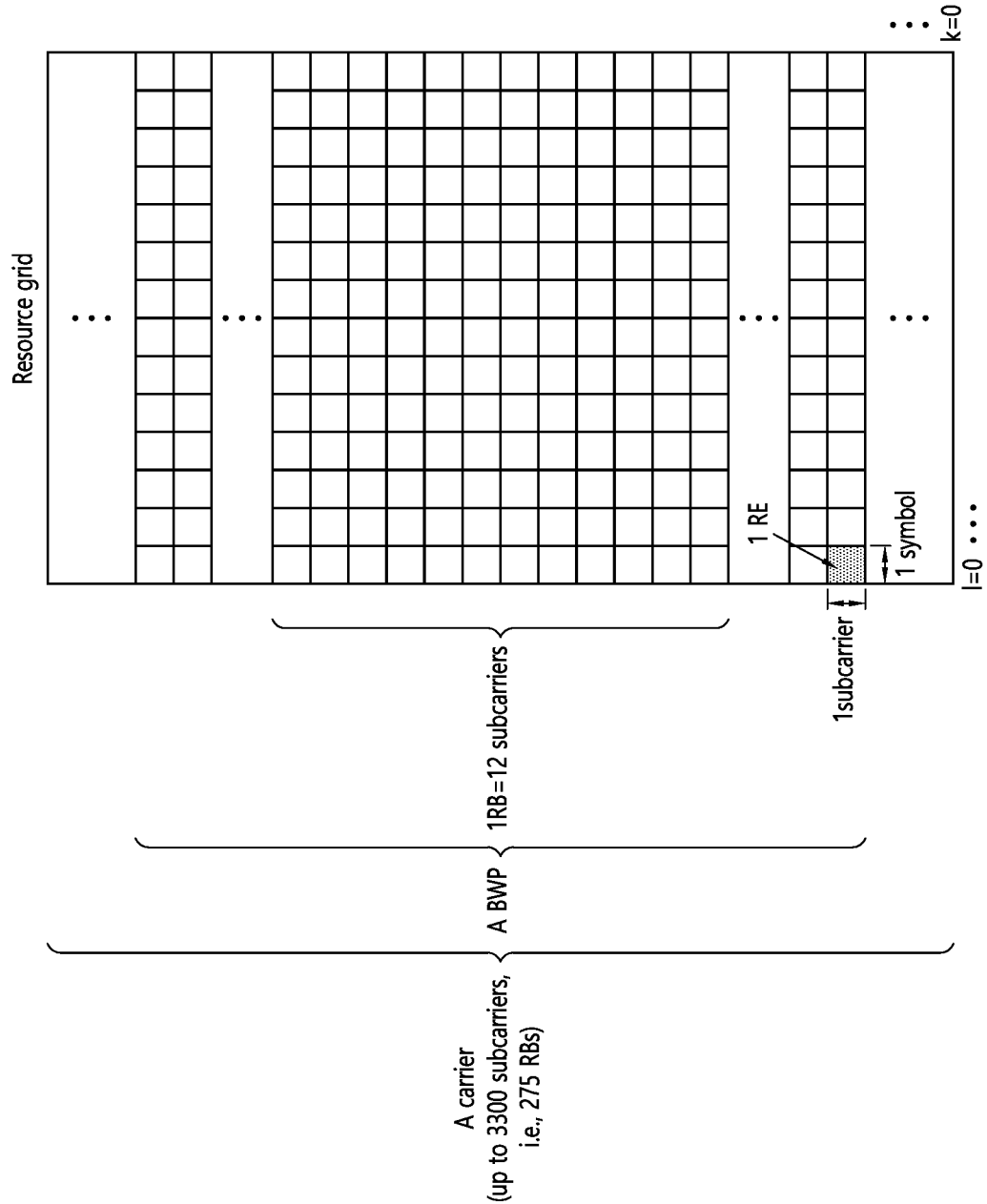
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
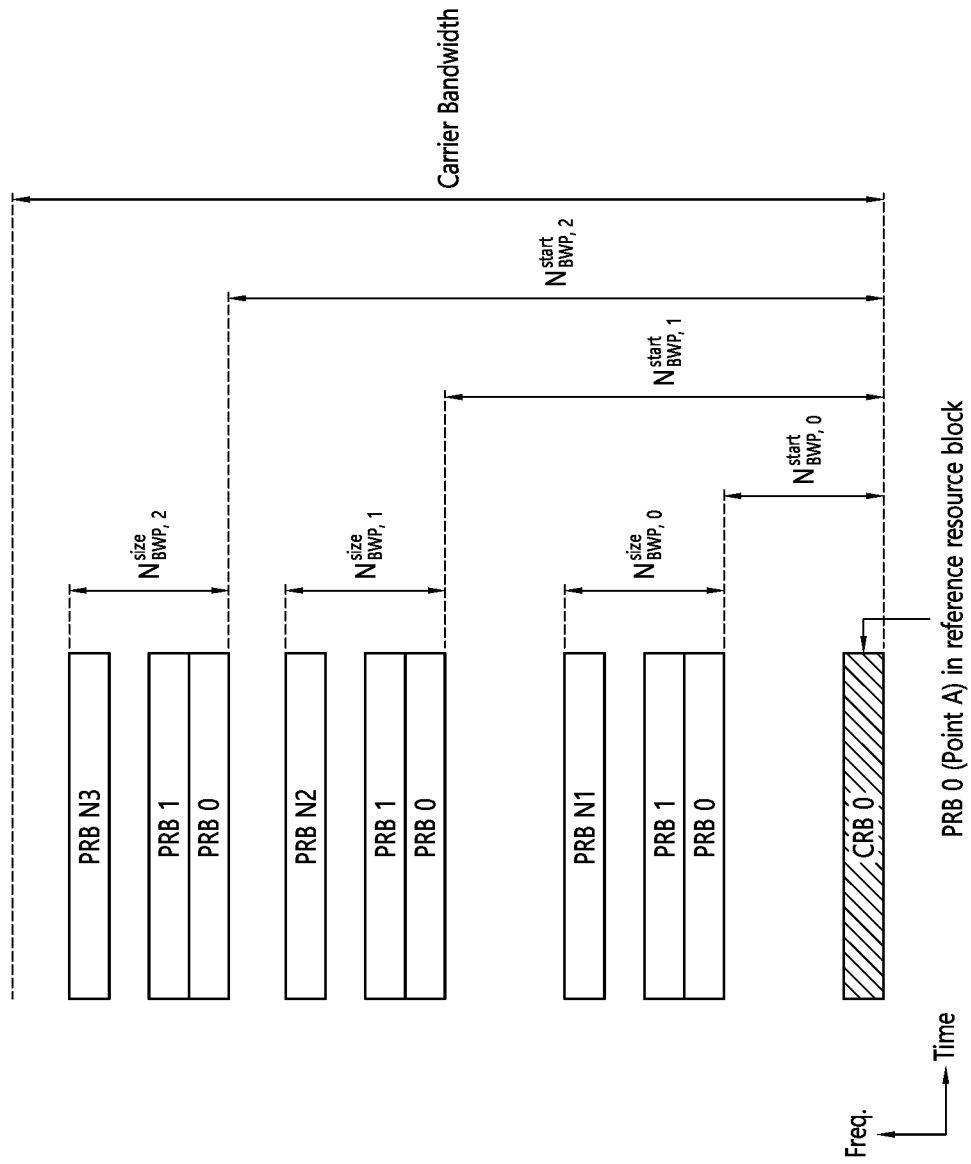
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
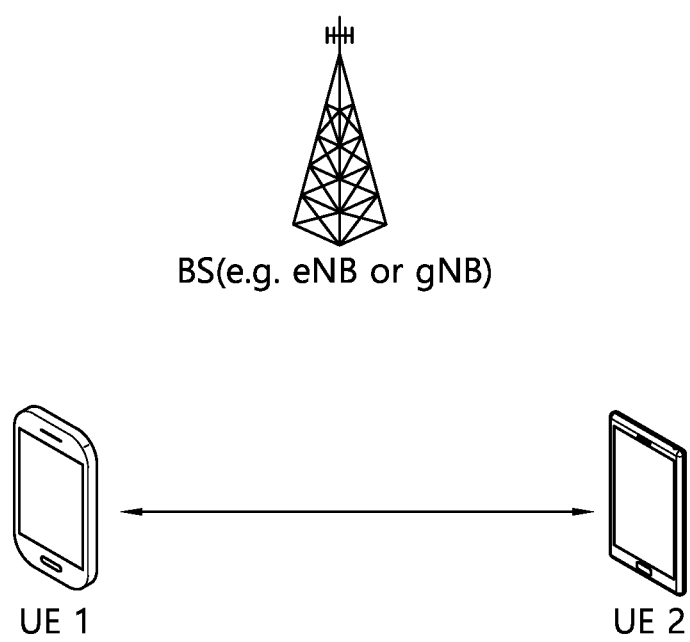
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
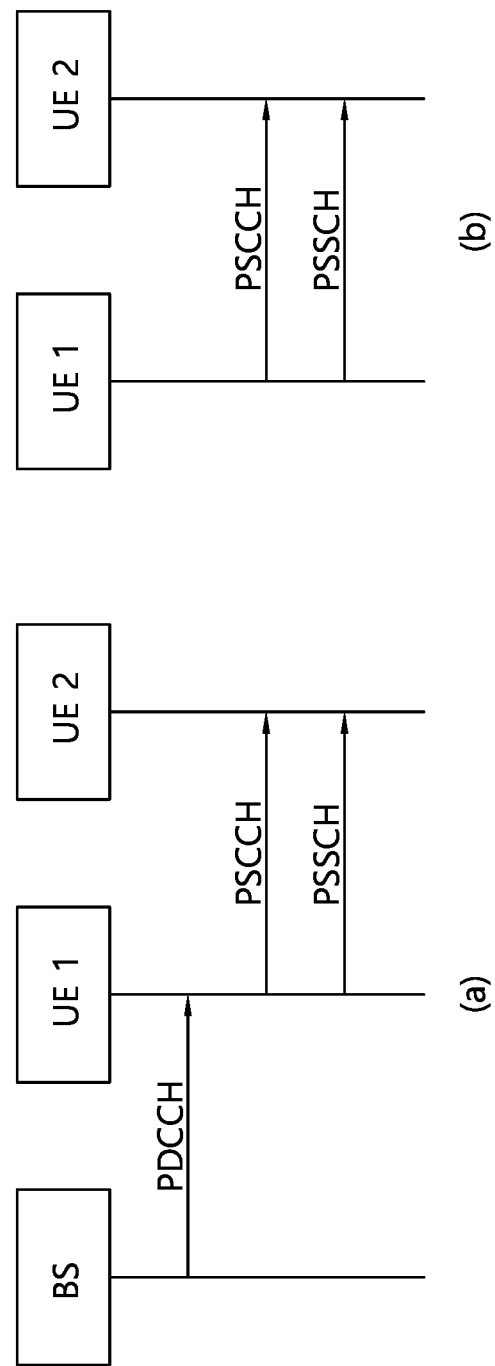
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
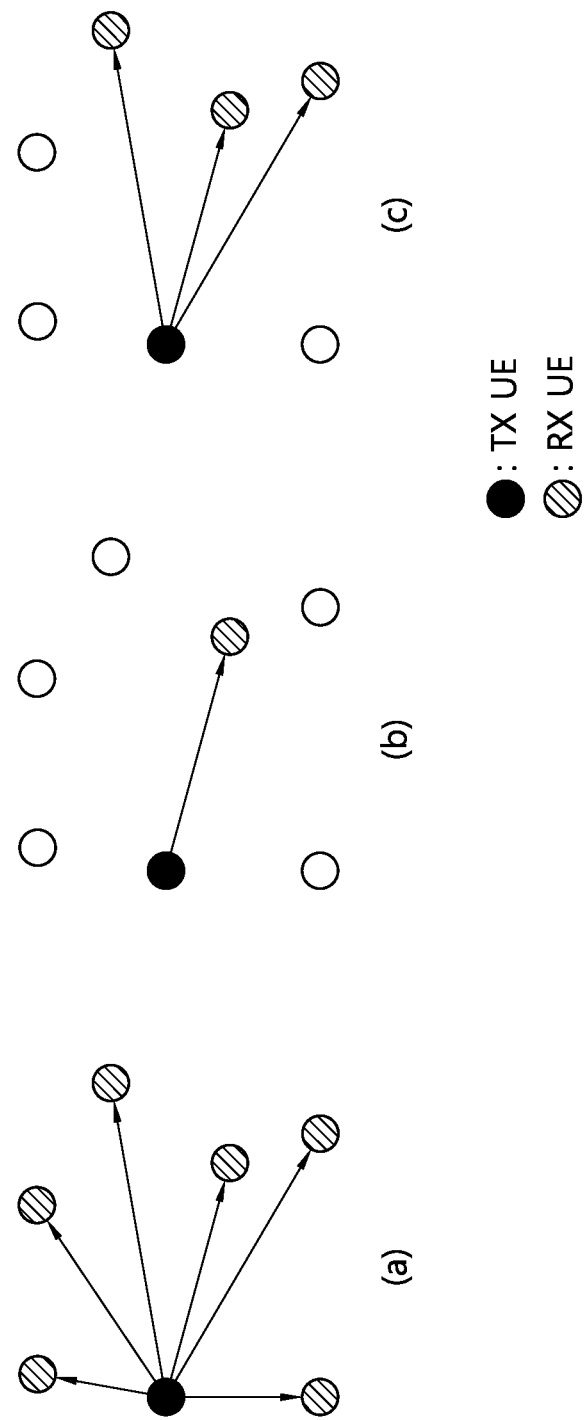
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the present disclosure, a transmitting UE (i.e., TX UE) may be a UE which transmits data to (target) receiving UE(s) (i.e., RX UE(s)). For example, the TX UE may be a UE which performs PSCCH transmission and/or PSSCH transmission. For example, the TX UE may be a UE which transmits SL CSI-RS(s) and/or a SL CSI report request indication to (target) RX UE(s). For example, the TX UE may be a UE which transmits a (control) channel (e.g., PSCCH, PSSCH, etc.) and/or reference signal(s) (e.g., DM-RS(s), CSI-RS(s), etc.) through the (control) channel, which is/are used for SL radio link monitoring (RLM) operation(s) and/or SL radio link failure (RLF) operation(s) of (target) RX UE(s).

Meanwhile, in the present disclosure, a receiving UE (i.e., RX UE) may be a UE which transmits SL HARQ feedback to transmitting UE(s) (i.e., TX UE(s)), based on whether or not data transmitted by TX UE(s) is decoded successfully and/or whether or not a PSCCH (related to PSSCH scheduling) transmitted by TX UE(s) is detected/decoded successfully. For example, the RX UE may be a UE which performs SL CSI transmission to TX UE(s) based on SL CSI-RS(s) and/or a SL CSI report request indication received from TX UE(s). For example, the RX UE may be a UE which transmits, to TX UE(s), an SL (L1) RSRP measurement value measured based on (pre-defined) reference signal(s) and/or SL (L1) RSRP report request indication received from TX UE(s). For example, the RX UE may be a UE which transmits its own data to TX UE(s). For example, the RX UE may be a UE which performs SL RLM operation(s) and/or SL RLF operation(s) based on a (pre-configured) (control) channel and/or reference signal(s) through the (control) channel received from TX UE(s).

Meanwhile, in various embodiments of the present disclosure, for example, when an RX UE transmits SL HARQ feedback information for the PSSCH and/or PSCCH received from a TX UE, the method below or some of the methods below may be considered. Here, for example, the following scheme or some of the following schemes may be limitedly applied only when an RX UE successfully decodes/detects a PSCCH scheduling a PSSCH.

(1) Groupcast option 1: NACK information may be transmitted to a TX UE only when an RX UE fails to decode/receive a PSSCH received from the TX UE.

(2) Groupcast option 2: If an RX UE succeeds in decoding/receiving a PSSCH received from a TX UE, transmit ACK information to the TX UE, and if the RX UE fails to decode/receive a PSSCH, it may transmit NACK information to the TX UE.

Meanwhile, in the present disclosure, a TX UE may transmit the entirety or part of information described below to RX UE(s) through SCI(s). Herein, for example, the TX UE may transmit the entirety or part of the information described below to the RX UE(s) through a first SCI and/or a second SCI.

PSSCH (and/or PSCCH) related resource allocation information (e.g., the number/positions of time/frequency resources, resource reservation information (e.g., period))

SL CSI report request indicator or SL (L1) RSRP (and/or SL (L1) RSRQ and/or SL (L1) RSSI) report request indicator SL CSI transmission indicator (or SL (L1) RSRP (and/or SL (L1) RSRQ and/or SL (L1) RSSI) information transmission indicator)) (on a PSSCH)

Modulation and coding scheme (MCS) information

Transmit power information

L1 destination ID information and/or L1 source ID information

SL HARQ process ID information

New data indicator (NDI) information

Redundancy version (RV) information (Transmission traffic/packet related) QoS information (e.g., priority information)

SL CSI-RS transmission indicator or information on the number of (to-be-transmitted) SL CSI-RS antenna ports Location information of the TX UE or location (or distance region) information of target RX UE(s) (for which SL HARQ feedback is requested)

Reference signal (e.g., DM-RS, etc.) information related to channel estimation and/or decoding of data to be transmitted through a PSSCH. For example, the reference signal information may be information related to a pattern of a (time-frequency) mapping resource of DM-RS, rank information, antenna port index information, information on the number of antenna ports, etc.

Meanwhile, in various embodiments of the present disclosure, for example, a TX UE may transmit SCI, first SCI and/or second SCI through PSCCH to an RX UE, PSCCH may be replaced/substituted with at least one of SCI, first SCI, and/or second SCI. And/or, for example, SCI may be replaced/replaced by PSCCH, first SCI and/or second SCI. And/or, for example, since a TX UE may transmit second SCI to an RX UE through PSSCH, the PSSCH may be replaced/substituted with second SCI.

Meanwhile, in the present disclosure, for example, if SCI configuration fields are divided into two groups in consideration of a (relatively) high SCI payload size, an SCI including a first SCI configuration field group may be referred to as a first SCI or a 1st SCI, and an SCI including a second SCI configuration field group may be referred to as a second SCI or a 2nd SCI. For example, the transmitting UE may transmit the first SCI to the receiving UE through the PSCCH. For example, the second SCI may be transmitted to the receiving UE through an (independent) PSCCH, or may be transmitted in a piggyback manner together with data through the PSSCH.

On the other hand, in various embodiments of the present disclosure, for example, "configuration" or "define" may mean (resource pool specific) (PRE)CONFIGURATION from a base station or network (via predefined signaling (e.g., SIB, MAC, RRC, etc.).

On the other hand, in the various embodiments of the present disclosure, for example, an RLF may be determined based on an OUT-OF-SYNCH (OOS) indicator or an IN-SYNCH (IS) indicator, it can be replaced/replaced by OUT-OF-SYNCH (OOS) or IN-SYNCH (IS).

Meanwhile, in the present disclosure, for example, a resource block (RB) may be replaced/substituted with a subcarrier, or vice versa. For example, a packet or a traffic may be replaced/substituted with a transport block (TB) or a medium access control protocol data unit (MAC PDU) according to a transmission layer, or vice versa.

For example, a code block group (CBG) may be replaced/substituted with a TB, or vice versa.

For example, a source ID may be replaced/substituted with a destination ID, or vice versa.

For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

On the other hand, in various embodiments of the present disclosure, for example, a dynamic grant (DG) may be substituted/substituted with a configured grant (CG) and/or an SPS grant. For example, a dynamic grant may be substituted/replaced with a combination of a configured grant and an SPS grant. In various embodiments of the present disclosure, a configured grant may include at least one of a configured grant type 1 and/or a configured grant type 2. For example, in configured grant type 1, a grant may be provided by RRC signaling and may be stored as a configured grant. For example, in configured grant type 2, a grant may be provided by a PDCCH, and may be stored or deleted as a configured grant based on L1 signaling indicating activation or deactivation of a grant.

Meanwhile, in various embodiments of the present disclosure, a channel may be substituted/substituted with a signal. For example, transmission/reception of a channel may include transmission/reception of a signal. For example, transmission/reception of a signal may include transmission/reception of a channel. Also, for example, a cast may be replaced/replaced with at least one of unicast, groupcast, and/or broadcast. For example, a cast type may be substituted/substituted with at least one of unicast, groupcast, and/or broadcast.

On the other hand, in various embodiments of the present disclosure, a resource may be interchanged/replaced with a slot or a symbol. For example, a resource may include a slot and/or a symbol.

Meanwhile, in various embodiments of the present disclosure, a blind retransmission may mean that a TX UE performs retransmission without receiving SL HARQ feedback information from an RX UE. For example, a retransmission based on an SL HARQ feedback may mean that a TX UE determines whether to perform retransmission based on SL HARQ feedback information received from an RX UE. For example, when a TX UE receives NACK and/or DTX information from an RX UE, the TX UE may perform retransmission to the RX UE.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in various embodiments of the present disclosure, a Uu channel may include a UL channel and/or a DL channel. For example, a UL channel may include PUSCH, PUCCH, SRS, and the like. For example, a DL channel may include PDCCH, PDSCH, PSS/SSS, and the like. For example, an SL channel may include PSCCH, PSSCH, PSFCH, PSBCH, PSSS/SSSS, and the like.

On the other hand, in various embodiments of the present disclosure, sidelink information may include at least one of a sidelink message, a sidelink packet, a sidelink service, a sidelink data, sidelink control information, and/or a sidelink Transport Block (TB). For example, sidelink information may be transmitted through PSSCH and/or PSCCH.

Figure 12:
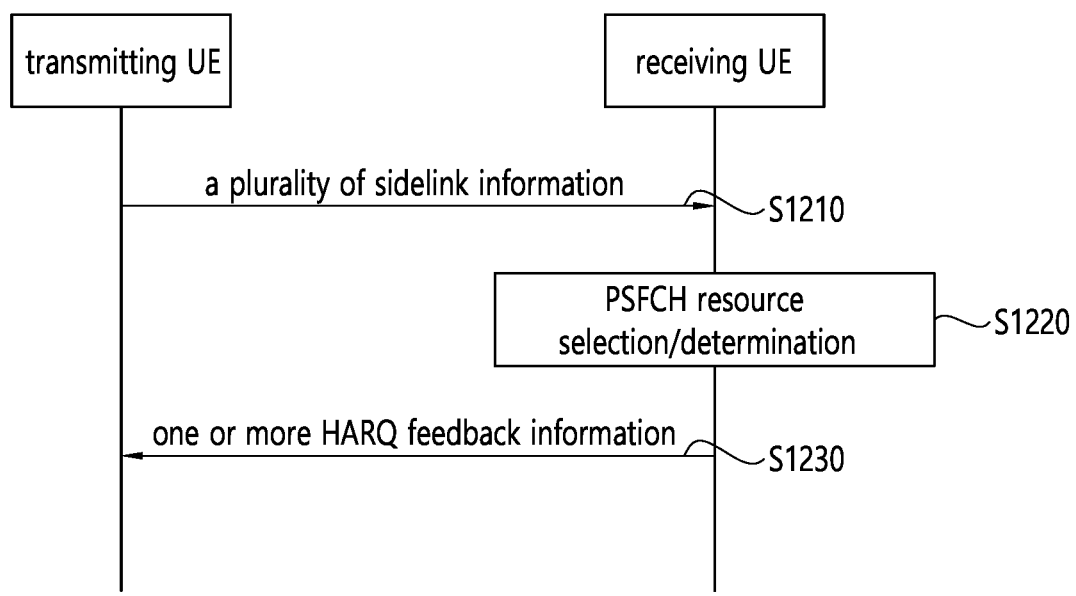
FIG. 12 is a figure showing a method for a receiving UE to select a PSFCH resource and transmit HARQ feedback information, according to an embodiment of the present disclosure.

FIG. 12 is a figure showing a method for a receiving UE to select a PSFCH resource and transmit HARQ feedback information, according to an embodiment of the present disclosure. FIG. 12 may be combined with various embodiments of the present disclosure.

Referring to FIG. 12, in step S1210, a transmitting UE may transmit a plurality of sidelink information to a receiving UE. In step S1220, a receiving UE may select or determine a PSFCH resource related to a plurality of received sidelink information. In step S1230, a receiving UE may transmit one or more HARQ feedback information to a transmitting UE using a selected or determined PSFCH resource. A method for a receiving UE to transmit a plurality of PSFCHs at the same time and/or to omit a PSFCH transmission or reception operation will be described according to various embodiments of the present disclosure.

Hereinafter, in some situations (Case A to Case C), a receiving UE may perform a plurality of PSFCH transmissions at the same time and/or omit a PSFCH transmission or a reception operation. Hereinafter, in some situations (Case A to Case C), a receiving UE may perform a plurality of PSFCH transmissions at the same time and omit a plurality of PSFCH receptions, or may omit a plurality of PSFCH transmissions and perform a plurality of PSFCH receptions. Here, for example, a transmitting UE may preferentially perform PSCCH and/or PSSCH-related PSFCH operations of relatively high priority, based on priority information related to a PSCCH and/or PSSCH linked to a PSFCH. That a transmitting UE preferentially performs a PSFCH operation related to a PSCCH and/or PSSCH of a relatively high priority based on priority information related to a PSCCH and/or PSSCH linked to a PSFCH may be referred to as rule 1.

Case A

In Case A, for example, a receiving UE may receive sidelink information (e.g., TB) and/or PSCCH and/or PSSCH from a plurality of transmitting UEs. For example, a receiving UE may receive a plurality of new sidelink information and/or PSCCH and/or PSSCH from a plurality of transmitting UEs. In this case, a receiving UE may have to transmit a PSFCH related to the sidelink information and/or a PSCCH and/or a PSSCH in the same slot. For example, a receiving UE may have to perform transmission of a plurality of PSFCHs related to the plurality of new sidelink information and/or PSCCH and/or PSSCH in the same slot. For example, all or part of resources related to a PSFCH transmission related to the sidelink information and/or a PSCCH and/or a PSSCH may overlap all or a part in the time resource domain. For example, resources related to transmissions of a plurality of PSFCHs related to the plurality of new sidelink information and/or a PSCCH and/or a PSSCH may all or partly overlap in a time resource domain. In this case, for example, a receiving UE may preferentially perform a PSCCH and/or a PSSCH-related PSFCH operation having a relatively high priority, based on priority information related to a PSCCH and/or PSSCH linked to a PSFCH.

Figure 13:
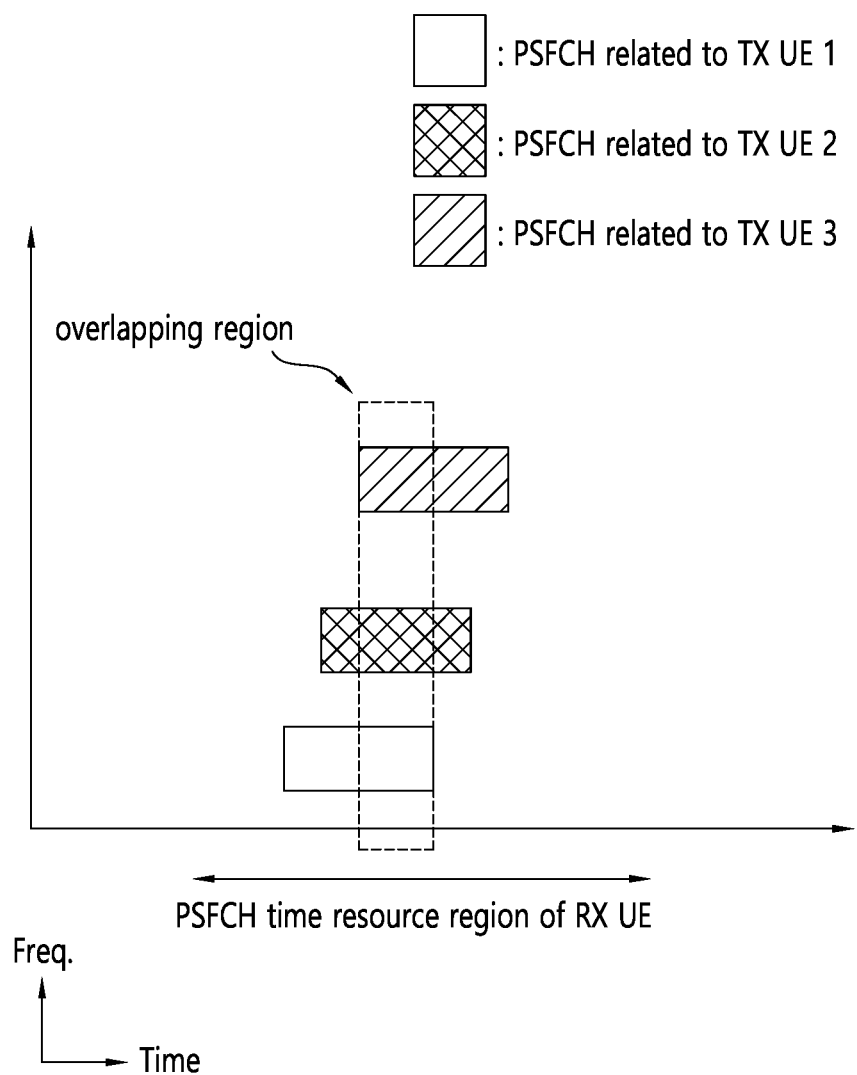
FIG. 13 shows an example of Case A in which a receiving UE performs a plurality of PSFCH transmissions at the same time and/or omits a PSFCH transmission or reception operation according to an embodiment of the present disclosure.

FIG. 13 shows an example of Case A in which a receiving UE performs a plurality of PSFCH transmissions at the same time and/or omits a PSFCH transmission or reception operation according to an embodiment of the present disclosure.

Referring to the FIG. 13, a receiving UE may receive sidelink information and/or a PSCCH and/or a PSSCH from a first transmitting UE, a second transmitting UE, and a third transmitting UE. In this case, a receiving UE may have to perform transmissions of a plurality of PSFCHs related to the plurality of sidelink information and/or PSCCH and/or PSSCH in the same slot. For example, resources related to transmissions of a plurality of PSFCHs linked to the plurality of sidelink information and/or a PSCCH and/or a PSSCH may all or partly overlap in a time resource domain. In this case, for example, a receiving UE may preferentially perform a PSCCH and/or a PSSCH-related PSFCH operation having a relatively high priority, based on priority information related to a PSCCH and/or PSSCH linked to a PSFCH.

Case B

In Case B, for example, a receiving UE may receive a plurality of sidelink information and/or PSCCH and/or PSSCH from a transmitting UE. For example, a receiving UE may receive a plurality of new sidelink information and/or PSCCH and/or PSSCH from a transmitting UE. In this case, a receiving UE may have to perform PSFCH transmission linked to the plurality of sidelink information and/or a PSCCH and/or a PSSCH in the same slot. For example, a receiving UE may have to perform transmissions of a plurality of PSFCHs related to the plurality of new sidelink information and/or a PSCCH and/or a PSSCH in the same slot. For example, resources related to PSFCH transmission related to the plurality of sidelink information and/or a PSCCH and/or a PSSCH may be all or partly overlapped in the time resource domain. For example, resources related to transmissions of a plurality of PSFCHs related to the plurality of new sidelink information and/or a PSCCH and/or a PSSCH may be all or partly overlapped in the time resource domain. In this case, for example, a receiving UE may preferentially perform a PSCCH and/or a PSSCH-related PSFCH operation having a relatively high priority, based on priority information related to a PSCCH and/or PSSCH linked to a PSFCH.

Figure 14:
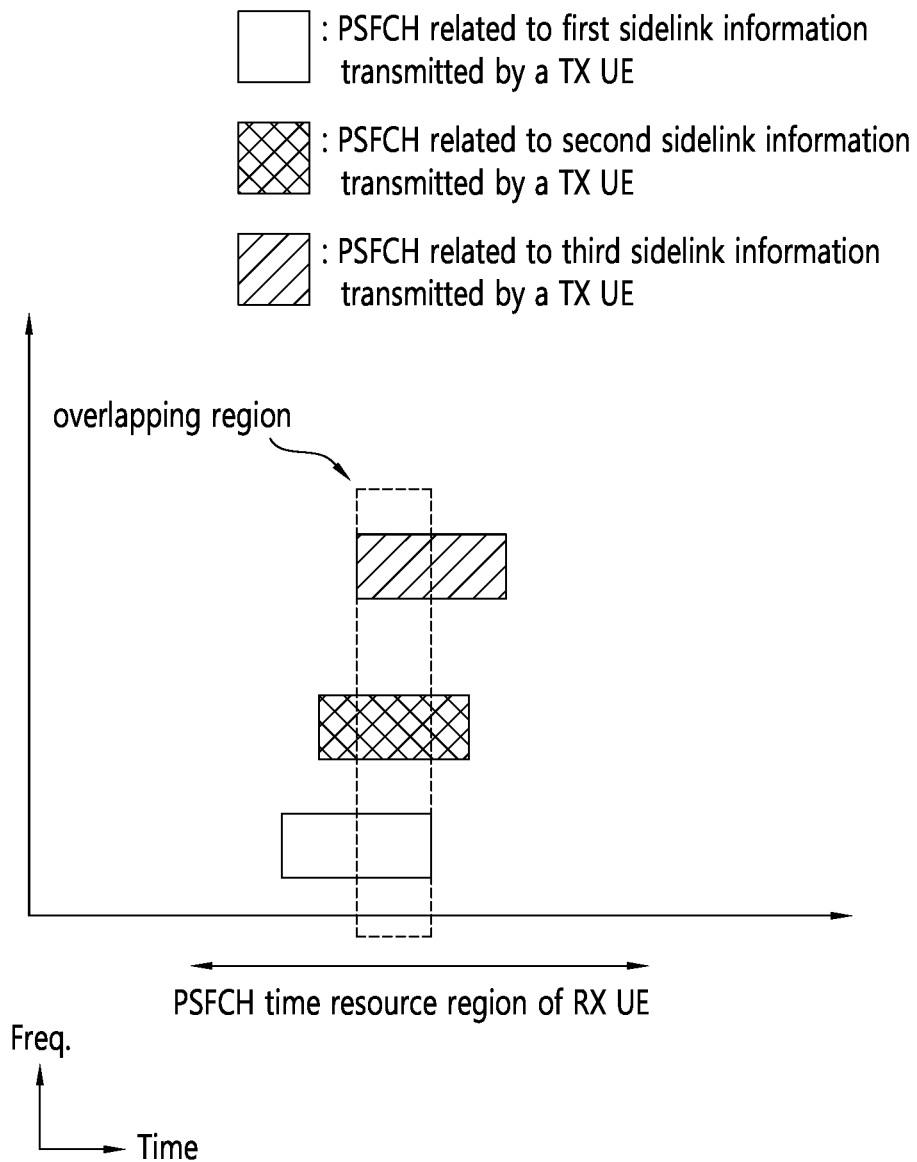
FIG. 14 shows an example of Case B in which a receiving UE performs a plurality of PSFCH transmissions at the same time and/or omits a PSFCH transmission or reception operation according to an embodiment of the present disclosure.

FIG. 14 shows an example of Case B in which a receiving UE performs a plurality of PSFCH transmissions at the same time and/or omits a PSFCH transmission or reception operation according to an embodiment of the present disclosure. FIG. 14 may be combined with various embodiments of the present disclosure.

Referring to FIG. 14, for example, a receiving UE may receive first sidelink information, second sidelink information, and third sidelink information from a transmitting UE. In this case, for example, a receiving UE may have to perform a plurality of PSFCH transmissions related to the plurality of sidelink information (e.g., first sidelink information, second sidelink information, and third sidelink information) in the same slot. For example, all or part of resources related to transmission of a plurality of PSFCHs linked to the plurality of sidelink information may overlap in the time resource domain. In this case, for example, a receiving UE may preferentially perform a PSCCH and/or a PSSCH-related PSFCH operation having a relatively high priority, based on priority information related to a PSCCH and/or PSSCH linked to a PSFCH.

Case C

In Case C, for example, a slot for receiving a PSFCH related to sidelink information and/or a PSCCH and/or a PSSCH transmitted by a UE and a slot for transmitting a PSFCH related to a PSCCH and/or a PSSCH received by a UE can be the same. For example, a slot for receiving a PSFCH related to new sidelink information and/or a PSCCH and/or a PSSCH transmitted by a UE and a slot for transmitting a PSFCH related to a new PSCCH and/or a PSSCH received by a UE can be the same. For example, a PSFCH reception resource related to sidelink information and/or a PSCCH and/or a PSSCH transmitted by a UE and a PSFCH transmission resource related to a PSCCH and/or a PSSCH received by a UE may be all or partly overlapped in the time resource domain. For example, a PSFCH reception resource related to new sidelink information and/or a PSCCH and/or a PSSCH transmitted by a UE and a PSFCH transmission resource related to new a PSCCH and/or a PSSCH received by a UE may be all or partly overlapped. In this case, for example, a receiving UE may preferentially perform a PSCCH and/or a PSSCH-related PSFCH operation having a relatively high priority, based on priority information related to a PSCCH and/or PSSCH linked to a PSFCH.

Figure 15:
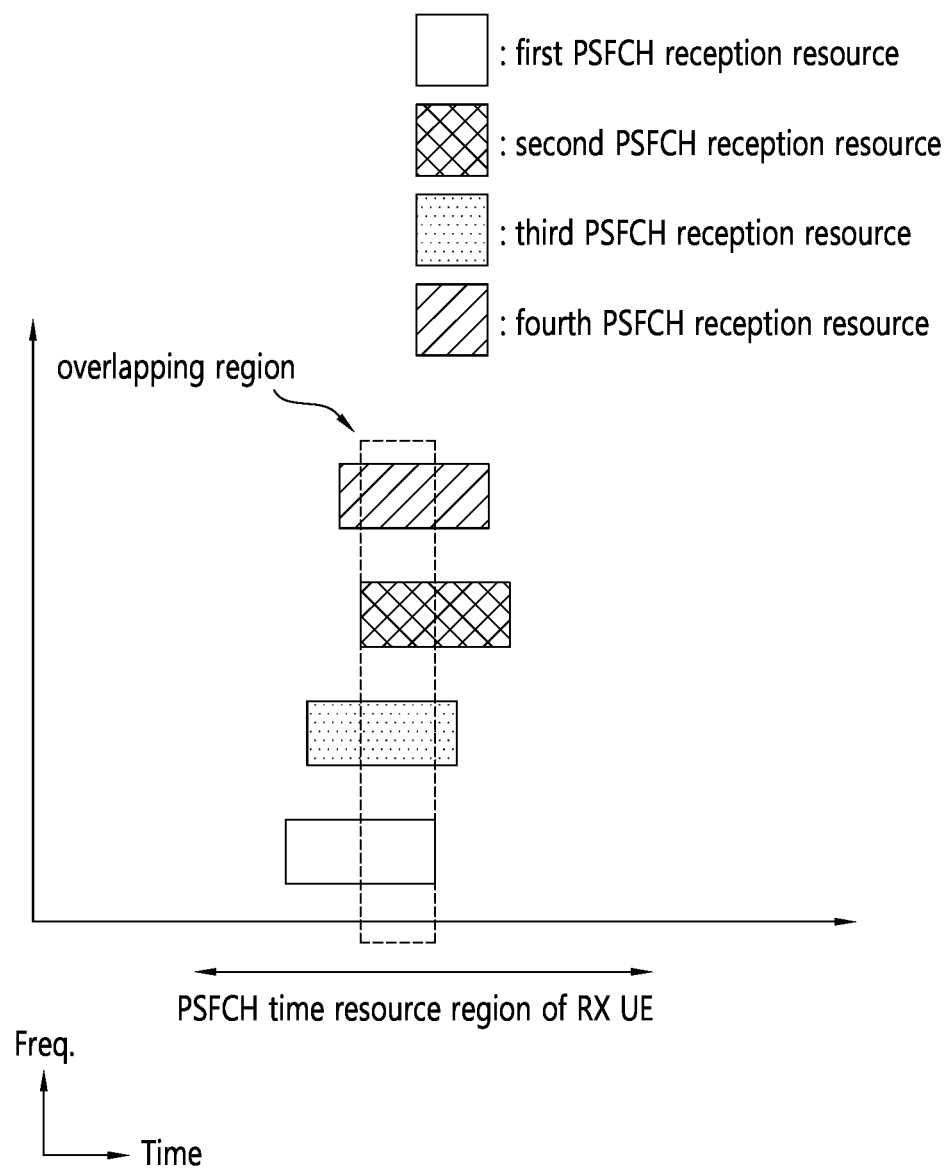
FIG. 15 shows an example of a situation in which a transmitting UE performs a plurality of PSFCH transmissions at the same time and/or omits a PSFCH transmission or reception operation according to an embodiment of the present disclosure.

FIG. 15 shows an example of a situation in which a transmitting UE performs a plurality of PSFCH transmissions at the same time and/or omits a PSFCH transmission or reception operation according to an embodiment of the present disclosure. FIG. 15 may be combined with various embodiments of the present disclosure.

Referring to the FIG. 15, a resource related to PSFCH reception related to sidelink information and/or a PSCCH and/or a PSSCH transmitted by a transmitting UE (For example, a first PSFCH reception resource and a second PSFCH reception resource) and a PSFCH transmission resource related to a PSCCH and/or a PSSCH received by a transmitting UE (e.g., a first PSFCH transmission resource and a second PSFCH transmission resource) may partly overlap in the time resource domain. In this case, for example, a receiving UE may preferentially perform a PSCCH and/or a PSSCH-related PSFCH operation having a relatively high priority, based on priority information related to a PSCCH and/or PSSCH linked to a PSFCH.

A rule or method for a UE to select a PSFCH on which PSFCH transmission and/or PSFCH reception will be performed will be described according to various embodiments of the present disclosure. Here, for example, whether to apply a rule for selecting a PSFCH below may be specifically configured differently for a UE according to a resource pool. For example, whether to apply a rule for selecting a PSFCH may be differently configured for a UE according to a service type/class and/or service priority and/or a cast type (e.g., unicast, groupcast or broadcast) and/or a destination UE and/or an L1 or L2 destination ID/an L1 or L2 source ID and/or a QoS parameter and/or resource pool congestion level/congestion level and/or a mode type.

According to an embodiment, when some of the following conditions are satisfied, a UE may omit transmission of a relatively low-priority PSFCH or a relatively high-priority PSFCH transmission among a plurality of PSFCHs requiring simultaneous transmission. For example, in the case of Case A or Case B, if some of the following conditions are satisfied, a receiving UE may omit transmission of a relatively low-priority PSFCH or a relatively high-priority PSFCH transmission among a plurality of PSFCHs requiring simultaneous transmission. Here, for example, when some of the following conditions are not satisfied, a UE may transmit the plurality of PSFCHs simultaneously. Here, for example, the transmit power difference between PSFCHs may be relatively large, and/or the separation distance between PSFCHs may be large in the frequency domain, and/or the number of PSFCHs for which simultaneous transmission is required may be large. In this case, according to various embodiments of the present disclosure, a UE may alleviate the problem of deterioration of peak-to-average power ratio (PAPR) characteristics and/or a problem of a decrease in error vector magnitude (EVM) performance and/or a problem of a decrease in spectrum emission performance and/or an increase in the required Maximum Power Reduction (MPR) value. That is, a UE can avoid the degradation of PSFCH detection performance.

The conditions under which a UE may omit transmission of a PSFCH having a relatively low priority or a transmission of a PSFCH having a relatively high priority among a plurality of PSFCHs requiring simultaneous transmission are as follows.

For example, it may be a case in which a difference in transmit power between a plurality of PSFCHs for which simultaneous transmission is required is equal to or greater than a pre-configured threshold. Or, for example, it may be a case where a difference in transmit power between a plurality of PSFCHs for which simultaneous transmission is required is less than or equal to a pre-configured threshold value. Here, for example, transmit power may be a maximum transmit power, a minimum transmit power, or an average transmit power. For example, transmit power may include transmit power required to transmit a PSFCH.

For example, it may be a case where separation distance in the frequency domain is greater than a pre-configured threshold value between a plurality of PSFCHs for which simultaneous transmission is required. Or, for example, between a plurality of PSFCHs for which simultaneous transmission is required, separation distance in the frequency domain may be smaller than a pre-configured threshold value. Here, for example, separation distance may be a maximum separation distance, a minimum separation distance, or an average separation distance. For example, separation distance may include a separation distance for a resource block (RB) or a separation distance for a subcarrier.

For example, it may be a case where the number of PSFCHs for which simultaneous transmission is required is equal to or greater than a pre-configured threshold. Or, for example, the number of PSFCHs for which simultaneous transmission is required may be less than or equal to a pre-configured threshold.

Additionally, for example, a UE may measure the average transmit power for a plurality of PSFCHs requiring simultaneous transmission, and may omit transmission for the PSFCH in which the difference between the average transmit power and its power is greater than a pre-configured threshold. For example, a UE may measure the maximum transmit power or the minimum transmit power for a plurality of PSFCHs requiring simultaneous transmission, and may omit transmission for a PSFCH in which the power difference between the maximum transmit power or the minimum transmit power and its power is greater than a pre-configured threshold.

Or, for example, a UE may measure the average separation distance or the maximum separation distance or the minimum separation distance in the frequency domain for a plurality of PSFCHs requiring simultaneous transmission, and may omit transmission for a PSFCH whose average separation distance or maximum separation distance or minimum separation distance is greater than a pre-configured threshold value.

According to an embodiment, when all or part of PSFCH transmission and PSFCH reception overlap, a UE may determine an operation of PSFCH transmission or PSFCH reception according to the following rules or methods. In this case, when a UE determines to transmit a PSFCH, a UE may select the number of PSFCHs simultaneously transmitted and/or types of PSFCHs. For example, a UE may also apply Rule 1 described above. For example, when a plurality of PSFCH transmissions and a plurality of PSFCH receptions overlap all or a part, a UE may determine an operation of PSFCH transmission or PSFCH reception according to some rules or methods below. In this case, when a UE determines to transmit a PSFCH, a UE may select the number of PSFCHs simultaneously transmitted and/or types of PSFCHs. For example, in case C, a transmitting UE may determine a PSFCH transmission or PSFCH reception operation according to some rules or methods below. In this case, when a UE performs PSFCH transmission, a UE may select the number of PSFCHs and/or types of PSFCHs that are simultaneously transmitted. For example, the case where PSFCH transmission and PSFCH reception overlap all or part may include a case where all or part of a resource related to PSFCH transmission and a resource related to PSFCH reception overlap in a time resource domain.

Here, for example, PSFCH transmission related to a pre-configured cast type (e.g., unicast), a pre-configured service type, a pre-configured service priority, and/or a pre-configured groupcast sidelink HARQ feedback option (e.g., groupcast option 2) and/or PSFCH reception may be assigned a relatively high priority compared to other cases.

Also, for example, if the priorities related to PSFCH transmission and/or PSFCH reception are the same, a UE may preferentially transmit and/or receive a PSFCH related to the most recently received and/or transmitted sidelink information/PSCCH/PSSCH or new sidelink information/PSCCH/PSSCH from the time of transmitting and/or receiving a sidelink HARQ feedback. Or, for example, if the priorities related to PSFCH transmission and/or PSFCH reception are the same, a UE may preferentially transmit and/or receive a PSFCH related to the most recently received and/or transmitted sidelink information/PSCCH/PSSCH or new sidelink information/PSCCH/PSSCH from the time when a sidelink HARQ feedback is transmitted and/or received.

For example, if the priorities related to PSFCH transmission and/or PSFCH reception are the same, a UE may preferentially transmit and/or receive a PSFCH related to PSCCH and/or PSSCH having a relatively high DMRS RSRP and/or RSRQ measurement value.

For example, if the priorities related to PSFCH transmission and/or PSFCH reception are the same, a UE may preferentially transmit and/or receive a PSFCH related to PSCCH and/or PSSCH of pre-configured cast type (e.g., unicast) and/or pre-configured groupcast sidelink HARQ feedback option (e.g., group cast option 2).

For example, when the priorities related to PSFCH transmission and/or PSFCH reception are the same, a UE may preferentially transmit and/or receive NACK information. Or, when the priorities related to PSFCH transmission and/or PSFCH reception are the same, a UE may preferentially transmit and/or receive ACK information.

For example, when the priorities related to PSFCH transmission and/or PSFCH reception are the same, a UE may randomly select a PSFCH to be transmitted and/or received. For example, if the priorities related to PSFCH transmission and/or PSFCH reception are the same, an operation of selecting a PSFCH to be transmitted and/or received may vary according to an operation implemented in a UE, but is not limited thereto. As such, when the priorities related to PSFCH transmission and/or PSFCH reception are the same, Rule 8 may refer to that a UE randomly selects a PSFCH to be transmitted and/or received or according to an implementation operation of a UE.

Also, for example, when some or all of the rules according to various embodiments of the present disclosure are applied, the number of PSFCHs that a UE can transmit simultaneously may not exceed the number of simultaneous transmissions of PSFCHs that a UE can support. For example, when some or all of the rules according to various embodiments of the present disclosure are applied, the maximum number of multiple PSFCHs that a UE can transmit at the same time may not exceed the number of simultaneous transmissions of PSFCHs that a UE can support (NUM_SIMTX).

When a PSFCH transmission and a PSFCH reception all or partly overlap, the rules for a UE to determine an operation of a PSFCH transmission or a PSFCH reception are as follows. In addition, the following rules may be applied to transmission of a plurality of PSFCHs required to be transmitted simultaneously. In addition, the following rules may be applied to reception of a plurality of PSFCHs required to be received simultaneously.

Rule 2

According to an embodiment, the highest priority related to PSFCH transmission may be higher than the highest priority related to PSFCH reception. In this case, for example, a UE may preferentially perform a PSFCH transmission operation. That is, a UE may omit a PSFCH reception operation. At this time, for example, when there are a plurality of PSFCHs requiring simultaneous transmission, a UE may select or determine a PSFCH to be transmitted simultaneously based on Rule 1 above, in the number of simultaneous transmissions of PSFCHs that a UE can support (NUM_SIMTX). For example, if there are multiple PSFCHs requiring simultaneous transmission, a UE may select or determine a PSFCH to be transmitted simultaneously based on Rule 1 within a pre-configured number of PSFCHs (e.g., 1). For example, based on Rule 1, a UE may select or determine PSFCHs to be transmitted as many as the number of PSFCHs that can be transmitted simultaneously, starting from transmission of PSFCH of relatively high priority, in descending order of priority.

According to an embodiment, when the highest priority related to PSFCH reception is higher than the highest priority related to PSFCH transmission, a UE may preferentially perform a PSFCH reception operation. That is, if the highest priority related to PSFCH reception is higher than the highest priority related to PSFCH transmission, a UE may omit a PSFCH transmission operation.

Rule 3

According to an embodiment, when a PSFCH of the highest priority corresponds to a PSFCH transmission operation, a UE may select or determine a PSFCH to be transmitted simultaneously based on Rule 1 from among a plurality of PSFCF transmissions falling within a range between the highest priority related to PSFCH transmission and the highest priority related to PSFCH reception, in the number of simultaneous transmissions of PSFCHs that a UE can support (NUM_SIMTX) or within a pre-configured number of PSFCHs (e.g., 1). For example, a UE may select or determine a PSFCH to transmit as many as the number of PSFCHs that a UE can transmit simultaneously (NUM_SIMTX) from a PSFCH transmission of relatively higher priority, in descending order of priority.

On the other hand, when the highest priority PSFCH corresponds to a PSFCH reception operation, a UE may preferentially perform a PSFCH reception operation. That is, when a PSFCH of the highest priority corresponds to a PSFCH reception operation, a UE may omit a PSFCH transmission operation.

Rule 4

According to an embodiment, a UE may select or determine a PSFCH to be transmitted simultaneously based on the rule 1 above, in the number of simultaneous transmissions of PSFCHs that a UE can support (NUM_SIMTX) or within a pre-configured number of PSFCHs (e.g., 1), among a PSFCH transmission having a difference in transmit power less than or equal to a pre-configured threshold and/or a plurality of PSFCH transmissions having a separation distance of frequency resources less than or equal to a pre-configured threshold, based on a parameter related to a PSFCH transmission of the highest priority and a PSFCH transmission (e.g., PSFCH transmit power, power required for PSFCH transmission, location of a frequency resource related to the PSFCH).

Alternatively, for example, a UE may select or determine a PSFCH to be transmitted simultaneously based on the rule 1 above, in the number of simultaneous transmissions of PSFCHs that a UE can support (NUM_SIMTX) or within a pre-configured number of PSFCHs (e.g., 1), among a transmission of PSFCH having a difference in transmit power greater than or equal to a pre-configured threshold and/or transmissions of a plurality of PSFCHs having a separation distance of frequency resources greater than or equal to a pre-configured threshold, based on a parameter related to a PSFCH transmission of the highest priority and a PSFCH transmission (e.g., PSFCH transmit power, power required for PSFCH transmission, location of a frequency resource related to the PSFCH). For example, a UE may select or determine a PSFCH to transmit as many as the number of PSFCHs that a UE can transmit simultaneously (NUM_SIMTX) from a relatively high priority PSFCH transmission in descending order of priority. Here, for example, transmit power may include a required transmit power.

Rule 5

According to an embodiment, a UE may select an operation related to a relatively large number of PSFCHs. For example, a UE may select an operation related to a number of PSFCHs greater than a pre-configured threshold. For example, when the number of PSFCHs for which a transmission operation is required is greater than the number of PSFCHs for which a reception operation is required, a UE may preferentially perform a PSFCH transmission operation.

Rule 6

According to an embodiment, when there are a plurality of sidelink HARQ feedback information related to PSFCH (e.g., channel selection), a UE may determine or consider the highest priority among PSCCH and/or PSSCH priorities linked to a PSFCH as a priority of the PSFCH. Alternatively, for example, when there are a plurality of sidelink HARQ feedback information related to PSFCH (e.g., channel selection), a UE may determine or consider the lowest priority among PSCCH and/or PSSCH priorities linked to a PSFCH as a priority of the PSFCH. Alternatively, for example, when there are a plurality of sidelink HARQ feedback information related to PSFCH (e.g., channel selection), a UE may determine or consider the average value of priorities of PSCCH and/or the PSSCH linked to a PSFCH as the priority of the PSFCH.

Rule 7

According to an embodiment, a UE may determine or consider a priority related to a PSFCH as the highest priority among a plurality of services or messages supported/exchanged through a session, unicast, or cast. For example, a UE may determine or consider a priority related to a PSFCH as the lowest priority among a plurality of services or messages supported/exchanged through a session, unicast, or cast. For example, a UE may determine or consider a priority related to a PSFCH as an average value of priorities for a plurality of services or messages supported/exchanged through a session or unicast or cast. For example, a UE may determine or consider a priority related to a PSFCH as a priority related to the most recently transmitted or received PSCCH/PSSCH or a priority related to the PSCCH/PSSCH linked to a PSFCH.

Here, for example, a PSFCH operation related to a relatively low priority session or PSCCH/PSSCH may be continuously omitted. Accordingly, a UE may configure a minimum guarantee ratio, a maximum guarantee ratio, or an average guarantee ratio related to PSFCH transmission for each resource pool. For example, a UE may configure a minimum guarantee ratio, a maximum guarantee ratio, or an average guarantee ratio for each of a service type/class and/or a service priority and/or a cast type (e.g., unicast, groupcast or broadcast) and/or a destination UE and/or a (L1 or L2) destination ID/(L1 or L2) source ID and/or a QoS parameter. Or, for example, a UE may configure a minimum omission rate, a maximum omission rate, or an average omission rate for each of a service type/class and/or a service priority and/or a cast type (e.g., unicast, groupcast or broadcast) and/or a destination UE and/or a (L1 or L2) destination ID/(L1 or L2) source ID and/or a QoS parameter.

Additionally, various embodiments of the present disclosure may be extended and applied even when a priority related to PSFCH transmission and/or a priority related to PSFCH reception are the same. In addition, various embodiments of the present disclosure may be extended and applied to PSFCHs having the same priority related to PSFCH transmission among a plurality of PSFCH transmissions required to be transmitted simultaneously. In addition, various embodiments of the present disclosure may be extended and applied to PSFCHs having the same priority related to PSFCH reception among receptions of a plurality of PSFCHs required to be simultaneously received.

On the other hand, according to an embodiment, PSFCH detection performance required for a UE may be different according to a service-related requirement and/or a QoS parameter (e.g., reliability, latency) and/or a service priority/class. Here, for example, in the case of a service of high reliability, the detection performance related to a PSFCH of a UE may be deteriorated due to the above-described various factors. In this case, it may be difficult for a UE to satisfy a service-related requirement.

Therefore, for example, the number of PSFCHs that a UE can transmit simultaneously may be configured or defined differently or independently for each service-related requirement. And/or, for example, the number of PSFCHs that a UE can transmit simultaneously may be configured or defined differently or independently for each QoS parameter. And/or, for example, the number of PSFCHs that a UE can transmit at the same time may be configured or defined differently or independently for each service type. And/or, for example, the number of PSFCHs that a UE can transmit at the same time may be configured or defined differently or independently for each service priority. And/or, for example, the number of PSFCHs that a UE can transmit at the same time may be configured or defined differently or independently for each resource pool. And/or, for example, the number of PSFCHs that a UE can transmit at the same time may be configured or defined differently or independently for each cast type. And/or, for example, the number of PSFCHs that a UE can transmit at the same time may be configured or defined differently or independently for each destination UE. And/or, for example, the number of PSFCHs that a UE can transmit at the same time (L1 or L2) may be configured or defined differently or independently for each destination ID. And/or, for example, the number of PSFCHs that a UE can transmit at the same time (L1 or L2) may be configured or defined differently or independently for each source ID. And/or, for example, the number of PSFCHs that a UE can transmit at the same time may be configured or defined differently or independently for each congestion level (e.g., congestion level of a resource pool). And/or, for example, the number of PSFCHs that a UE can transmit at the same time may be configured or defined differently or independently for each mode type (e.g., resource allocation mode 1 or resource allocation mode 2). And/or, for example, the number of PSFCHs that a UE can transmit at the same time may be configured or defined differently or independently for each power difference between PSFCH transmissions. For example, power difference between PSFCH transmissions may include at least one of a maximum power difference between PSFCH transmissions, a minimum power difference between PSFCH transmissions, and/or an average power difference between PSFCH transmissions. And/or, for example, the number of PSFCHs that a UE can transmit at the same time may be configured or defined differently or independently for each separation distance of a frequency resource between PSFCH transmissions. For example, the separation distance of frequency resources between PSFCH transmissions may include at least one of a maximum separation distance of frequency resources between PSFCH transmissions, a minimum separation distance of frequency resources between PSFCH transmissions, and/or an average separation distance of frequency resources between PSFCH transmissions. Here, for example, the number of PSFCHs that a UE can transmit simultaneously may be the number of PSFCHs that a UE can support and can simultaneously transmit. For example, the number of PSFCHs that a UE can transmit at the same time may be the maximum number of PSFCHs that a UE can transmit at the same time. For example, the number of PSFCHs that a UE can transmit at the same time may be the minimum number of PSFCHs that a UE can transmit at the same time. For example, the number of PSFCHs that a UE can transmit at the same time may be configured or defined differently or independently in a resource pool-specific manner. For example, in the case of a service having a relatively high reliability and/or short latency requirement, a UE may configure a relatively small number of PSFCHs transmitted simultaneously. Here, for example, according to various embodiments of the present disclosure, a UE may report information on the number of its own supportable simultaneous transmission PSFCHs to a base station for each service-related requirement. For example, a UE may report to a base station information on the maximum or minimum supportable number of PSFCHs that can be transmitted at the same time for each of a service-related requirement and/or a QoS parameter and/or a service priority/type and/or a maximum/minimum power/average power difference between PSFCH transmissions and/or a maximum separation/minimum separation/average separation distance of frequency resources between PSFCH transmissions.

On the other hand, according to an embodiment, a UE (e.g., a receiving UE) participating in sidelink communication may inform information about the number of supportable simultaneous transmissions of PSFCHs, through predefined signaling (e.g., PC5 RRC signaling) to its target UE (e.g., transmitting UE). Here, for example, the number of simultaneous transmissions of PSFCHs that a UE can support may be the maximum number of simultaneous transmissions of PSFCHs or the minimum number of simultaneous transmissions of PSFCHs. In this case, for example, a target UE may not transmit sidelink information and/or PSCCH and/or PSSCH requiring simultaneous transmission of a number of PSFCHs exceeding the number of simultaneous transmissions of PSFCHs to a UE. Additionally, for example, a UE (e.g., a transmitting UE) participating in sidelink communication may inform its target UE (e.g., a receiving UE) of information on the number of its supportable simultaneous receptions of PSFCHs, through predefined signaling (e.g., PC5 RRC signaling). Here, for example, the number of simultaneous receptions of PSFCHs that a UE can support may be the maximum number of simultaneous receptions of PSFCHs or the minimum number of simultaneous receptions of PSFCHs. In this case, for example, a target UE may not transmit a number of PSFCHs exceeding the number of its supportable simultaneous receptions of PSFCHs to a UE. For example, a UE may report information on its supportable number of simultaneous transmissions of PSFCHs or information on its supportable number of simultaneous receptions of PSFCHs to a base station.

For example, when a target UE transmits sidelink information and/or PSCCH and/or PSSCH requiring simultaneous transmissions of a number of PSFCHs exceeding the number of simultaneous transmissions of PSFCHs to a UE, a UE may transmit the most recent or most past number of PSFCHs related to sidelink information and/or PSCCHs and/or a PSSCH, that can be transmitted simultaneously from the time of sidelink HARQ feedback transmission, to a target UE. Also, for example, when a target UE transmits a number of PSFCHs exceeding the number of simultaneous receptions of PSFCHs to a UE, a UE may receive the most recent or most past number of PSFCHs, that can be received simultaneously from the time of sidelink HARQ feedback transmission, from a target UE.

For example, when a target UE transmits sidelink information and/or PSCCH and/or PSSCH requiring simultaneous transmissions of a number of PSFCHs exceeding the number of simultaneous PSFCHs to a UE, a UE may transmit PSFCHs of the number of simultaneous transmissions of PSFCHs to a target UE, starting with PSFCH transmission having a relatively high priority, in descending order of priority. For example, when a UE transmits PSFCHs of the same priority, a UE may be configured to preferentially transmit the most recent or most past number of PSFCHs related to sidelink information and/or a PSCCH and/or a PSSCH, that can be transmitted simultaneously from the time of sidelink HARQ feedback transmission, to a target UE. Or, for example, the (some) method in Rule 8 may be applied to a UE. Also, for example, when a target UE transmits a number of PSFCHs exceeding the number of simultaneous receptions of PSFCHs to a UE, a UE may receive PSFCHs of the number of simultaneously received PSFCHs from a target UE from receptions of PSFCHs of relatively high priority, in descending order of priority. For example, when a UE receives PSFCHs of the same priority, a UE may be configured to preferentially receive the most recent or most past number of PSFCHs related to sidelink information and/or a PSCCH and/or a PSSCH, that can be received simultaneously from the time of sidelink HARQ feedback reception, from a target UE.

For example, when a target UE transmits sidelink information and/or PSCCH and/or PSSCH requiring simultaneous transmissions of a number of PSFCHs exceeding the number of simultaneous transmissions of PSFCHs to a UE, a UE may transmit PSFCHs of the number of simultaneous transmissions of PSFCHs, related to a PSCCH and/or a PSSCH with relatively high DMRS RSRP and/or RSRQ measurements to a target UE. Or, for example, when a target UE transmits a number of PSFCHs exceeding the number of simultaneous receptions of PSFCHs to a UE, a UE may receive PSFCHs of the number of simultaneous receptions of PSFCHs, related to a PSCCH and/or a PSSCH with relatively high DMRS RSRP and/or RSRQ measurements from a target UE.

For example, when a target UE transmits sidelink information and/or PSCCH and/or PSSCH requiring simultaneous transmissions of a number of PSFCHs exceeding the number of simultaneous transmissions of PSFCHs to a UE, a UE may preferentially transmit the number of simultaneous PSFCHs to a target UE, starting with PSCCH and/or PSSCH-related PSFCH transmission of a pre-configured cast type and/or a group cast sidelink HARQ feedback option (e.g., group cast option 2). Or, for example, when a target UE transmits a number of PSFCHs exceeding the number of simultaneous receptions of PSFCHs to a UE, a UE may preferentially receive the number of simultaneous PSFCHs from a target UE, starting with PSCCH and/or PSSCH-related PSFCH reception of a pre-configured cast type and/or a group cast sidelink HARQ feedback option (e.g., group cast option 2).

For example, capabilities related to PSFCH transmission and/or capabilities related to PSFCH reception may be different between a plurality of UEs. In consideration of this, a plurality of UEs may exchange information on capability related to PSFCH transmission and/or information on capability related to PSFCH reception with each other. For example, a plurality of UEs may be UEs participating in SL communication. For example, information about capabilities related to PSFCH transmission and/or information about capabilities related to PSFCH reception may be exchanged between a plurality of UEs through predefined signaling (e.g., PC5 RRC signaling).

Meanwhile, according to an embodiment, as described above, when the difference in transmit power between PSFCHs simultaneously transmitted is large, a problem in which PAPR characteristics deteriorate and/or a problem in which Error Vector Magnitude (EVM) performance decreases and/or a problem in which spectral emission performance decreases and/or a problem in which the required Maximum Power Reduction (MPR) value increases may occur. Here, for example, a transmit power may be a maximum transmit power or a minimum transmit power or an average transmit power. Therefore, when the difference in transmit power between simultaneously transmitted PSFCHs is greater than a pre-configured threshold, a UE may equally configure/distribute transmit power between PSFCHs that are simultaneously transmitted. And/or, for example, in the case of a service having a reliability/QoS parameter requirement in which the difference in transmit power between simultaneously transmitted PSFCHs is greater than or equal to a pre-configured threshold, a UE may equally configure/distribute transmit power between PSFCHs that are simultaneously transmitted. Here, for example, when a receiving UE is enabled for sidelink power control related to PSCCH and/or PSSCH and/or PSFCH, a receiving UE may use or apply different or independent transmit power values and/or parameters when simultaneously transmitting a PSFCH. In other words, even when, for example, a UE simultaneously transmits a plurality of PSFCHs related to sidelink information of different priorities, a UE may transmit a plurality of PSFCHs by equally configuring/distributing the transmit power for a plurality of PSFCHs. And/or, for example, even when a UE simultaneously transmits a plurality of PSFCHs related to PSSCHs of different priorities, a UE may transmit a plurality of PSFCHs by equally configuring/distributing the transmit power for a plurality of PSFCHs. And/or, for example, even when a UE simultaneously transmits a plurality of PSFCHs related to PSCCHs of different priorities, a UE may transmit a plurality of PSFCHs by equally configuring/distributing the transmit power for a plurality of PSFCHs.

For example, on a PSSCH slot and/or a PSCCH slot related to a PSFCH slot, the maximum number of (new) TBs that a UE can transmit may be configured differently or independently in a specific resource pool. For convenience of description, the maximum number of (new) TBs that a UE can transmit may be referred to as MAX_TB. And/or, for example, on a PSSCH slot and/or a PSCCH slot related to a PSFCH slot, MAX_TB may be configured differently or independently in a service type-specific manner. And/or, for example, on a PSSCH slot and/or a PSCCH slot related to a PSFCH slot, MAX_TB may be specifically configured differently or independently of service priority. And/or, for example, on a PSSCH slot and/or a PSCCH slot related to a PSFCH slot, MAX_TB may be configured differently or independently of a specific cast type. And/or, for example, on a PSSCH slot and/or a PSCCH slot related to a PSFCH slot, MAX_TB may be configured differently or independently in a destination UE-specific manner. And/or, for example, on a PSSCH slot and/or a PSCCH slot related to a PSFCH slot, MAX_TB (L1 or L2) may be specifically configure differently or independently of a destination ID. And/or, for example, on a PSSCH slot and/or a PSCCH slot related to a PSFCH slot, MAX_TB (L1 or L2) can be configured specifically differently or independently of a source ID. And/or, for example, on a PSSCH slot and/or a PSCCH slot related to a PSFCH slot, MAX_TB may be configured differently or independently of a specific QoS parameter. And/or, for example, on a PSSCH slot and/or a PSCCH slot related to a PSFCH slot, MAX_TB may be specifically configured differently or independently of a congestion level (e.g., a congestion level of a resource pool). And/or, for example, on a PSSCH slot and/or a PSCCH slot related to a PSFCH slot, MAX_TB may be specifically configured differently or independently of a mode type (e.g., resource allocation mode 1 or resource allocation mode 2). For example, MAX_TB may be the maximum number of (new) TBs that a transmitting UE can transmit to a target receiving UE. For example, a MAX_TB value may be less than or equal to the number of PSSCH slots and/or the number of PSCCH slots related to a PSFCH slot. For example, a PSSCH slot and/or a PSCCH slot may be linked with one PSFCH slot. For example, a PSSCH slot and/or a PSCCH slot may be linked with one PSFCH slot in a resource pool. According to the above-described embodiment, the above-described problem that occurs when a UE transmits a plurality of PSFCHs at the same time can be alleviated.

For example, within a period of a PSFCH slot, MAX_TB may be configured differently or independently of a resource pool-specifically. And/or, for example, within a period of a PSFCH slot, MAX_TB may be configured differently or independently in a service type-specific manner. And/or, for example, within a period of a PSFCH slot, MAX_TB may be configured differently or independently of a service priority-specifically. And/or, for example, within a period of a PSFCH slot, MAX_TB may be configured differently or independently of a cast type-specifically. And/or, for example, within a period of a PSFCH slot, MAX_TB may be configured differently or independently to a destination UE-specifically. And/or, for example, within a period of a PSFCH slot, MAX_TB may be specifically configured differently or independently of a (L1 or L2) destination ID. And/or, for example, within a period of a PSFCH slot, MAX_TB may be specifically configured differently or independently of a (L1 or L2) source ID. And/or, for example, within a period of a PSFCH slot, MAX_TB may be specifically configured differently or independently of a QoS parameter. And/or, for example, within a period of a PSFCH slot, MAX_TB may be specifically configured differently or independently of congestion level (for example, congestion level of a resource pool). And/or, for example, within a period of a PSFCH slot, MAX_TB may be specifically configured differently or independently of congestion level (for example, congestion level of a resource pool). And/or, for example, within a period of a PSFCH slot, MAX_TB may be specifically configured differently or independently of a mode type (e.g., resource allocation mode 1 or resource allocation mode 2). For example, MAX_TB may be the maximum number of (new) TBs that a transmitting UE can transmit to a target receiving UE. For example, a MAX_TB value may be less than or equal to a period value of a PSFCH slot. According to the above-described embodiment, the above-described problem that occurs when a UE transmits a plurality of PSFCHs at the same time can be alleviated.

For example, in order to determine a priority between PSFCH transmission and PSFCH reception, when one or more PSFCH transmissions are required for a UE, the highest priority related to PSCCH/PSSCH may be used to determine a priority of PSFCH transmission. For example, in order to determine a priority between PSFCH transmission and PSFCH reception, when a UE is required to receive one or more PSFCHs, the highest priority related to PSCCH/PSSCH may be used to determine a priority of PSFCH reception.

On the other hand, when N PSFCH transmissions and N PSFCH receptions overlap in the time domain, a UE may transmit or receive only one set of PSFCHs corresponding to the smallest priority field value. Here, for example, the smallest priority field value may be determined by a first set and a second set of SCI format 1-A, related to N PSFCH transmissions and N PSFCH receptions, respectively. Also, for example, when a UE transmits N PSFCHs, a UE may transmit N PSFCHs corresponding to the smallest priority field value indicated in all SCI format 1-A related to PSFCH transmission.

Figure 16:
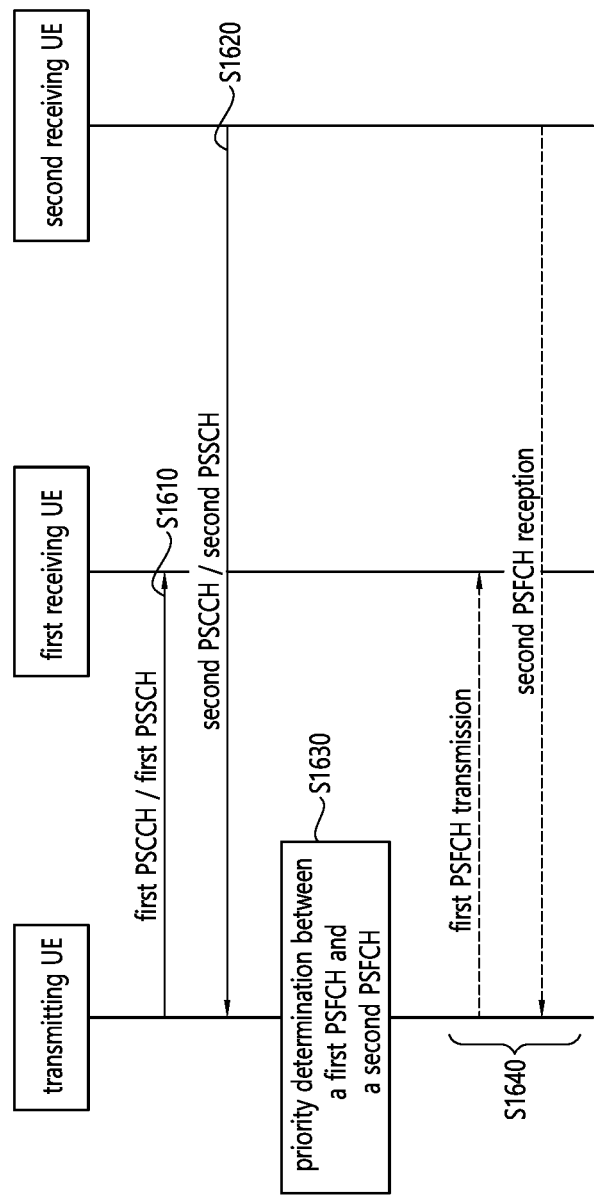
FIG. 16 shows a procedure for a transmitting UE to determine a priority between transmissions of a plurality of first PSFCHs and receptions of a plurality of second PSFCHs overlapping in the time domain, according to an embodiment of the present disclosure.

FIG. 16 shows a procedure for a transmitting UE to determine a priority between transmissions of a plurality of first PSFCHs and receptions of a plurality of second PSFCHs overlapping in the time domain, according to an embodiment of the present disclosure. FIG. 16 may be combined with various embodiments of the present disclosure.

FIG. 16 is an example in which a transmitting UE performs sidelink communication with a first receiving UE and a second receiving UE. Various embodiments of the present disclosure are not limited to the embodiment of FIG. 16, and may be extended and applied to an example in which a transmitting UE performs a plurality of sidelink communications with one receiving UE.

Referring to FIG. 16, in step S1610, a transmitting UE may receive a first PSCCH and/or a first PSSCH related to a first PSCCH from a first receiving UE.

In step S1620, a transmitting UE may transmit a second PSCCH and/or a second PSSCH related to a second PSCCH to a second receiving UE.

In step S1630, a transmitting UE may determine a priority between transmissions of a plurality of first PSFCHs and receptions of a plurality of second PSFCHs. For example, when a plurality of first PSFCH transmissions and a plurality of second PSFCH receptions overlap in the time domain, a transmitting UE may determine a priority between receptions of a plurality of first PSFCHs and transmissions of a plurality of second PSFCHs. For example, a plurality of first PSFCH transmissions may be an operation of transmitting a plurality of HARQ feedbacks corresponding to a plurality of first PSSCHs to a first receiving UE through a plurality of first PSFCHs. For example, a plurality second PSFCH receptions may be an operation of receiving a plurality of HARQ feedbacks corresponding to a plurality of second PSSCHs from a second reception UE through a plurality of second PSFCHs.

For example, a transmitting UE may determine a higher priority among a plurality of first PSFCH transmissions or a plurality of second PSFCH receptions, based on the highest priority related to transmissions of a plurality of first PSFCHs and the highest priority related to receptions of a plurality of second PSFCHs. For example, a plurality of priorities related to transmissions of a plurality of first PSFCHs may be a plurality of priorities related to receptions of a plurality of first PSSCHs. For example, a plurality of priorities related to receptions of a plurality of first PSSCHs may be included in a plurality of SCIs received through a plurality of first PSCCHs. For example, a plurality of priorities related to receptions of a plurality of second PSFCHs may be a plurality of priorities related to transmissions of a plurality of second PSSCHs. For example, a plurality of priorities related to transmissions of a plurality of second PSSCHs may be included in a plurality of SCIs transmitted through a plurality of second PSCCHs. For example, an SCI format may be SCI format 1-A. For example, the lower a priority value included in an SCI format 1-A, the higher the priority may be.

In step S1640, a transmitting UE may perform a plurality of first PSFCH transmissions or may perform a plurality of second PSFCH receptions. For example, when a highest priority related to transmissions of a plurality of first PSFCHs is higher than a highest priority related to receptions of a plurality of second PSFCHs, a transmitting UE may transmit a plurality of first PSFCHs to a first receiving UE.

For example, when the difference in transmit power between a plurality of first PSFCH transmissions is less than or equal to a pre-configured threshold, a transmitting UE may transmit a plurality of first PSFCHs to a first receiving UE. For example, when the separation distance in the frequency domain related to transmission of a plurality of first PSFCHs is less than a pre-configured threshold value, a transmitting UE may transmit a plurality of first PSFCHs to a first receiving UE. For example, when the number of a plurality of first PSFCH transmissions is less than or equal to a pre-configured threshold, a transmitting UE may transmit a plurality of first PSFCHs to a first receiving UE. For example, a transmitting UE may transmit a plurality of first PSFCHs to a first receiving UE, from a first PSFCH transmission with the highest priority in descending order related to a priority.

For example, a transmitting UE may transmit a plurality of first PSFCHs to a first receiving UE based on the number of simultaneously transmittable PSFCHs. For example, when the number of a plurality of first PSFCH transmissions is 5 and the number of PSFCHs that can be transmitted simultaneously is 3, a transmitting UE may perform three first PSFCH transmissions to a first receiving UE in descending order related to a priority from a first PSFCH transmission of the highest priority. For example, three first PSFCH transmissions corresponding to the number of simultaneously transmittable PSFCHs may be transmissions having a transmit power difference equal to or less than a pre-configured threshold value, based on a parameter (e.g., PSFCH transmit power) related to a first PSFCH transmission of the highest priority. For example, transmission of three first PSFCHs corresponding to the number of PSFCHs that can be transmitted simultaneously may be transmission having a separation distance of frequency resources equal to or less than a pre-configured threshold value, based on a parameter (e.g., the location of a frequency resource related to the PSFCH) related to a first PSFCH transmission of the highest priority.

For example, the number of PSFCHs that can be transmitted simultaneously may be configured differently based on at least one of a service-related requirement, a QoS parameter, a service priority, a service type, a resource pool, a cast type, a destination UE, a destination ID, a source ID, a mode type, congestion level, transmit power difference between PSFCH transmissions or separation distance on frequency resources between PSFCH transmissions.

For example, a transmitting UE may report information related to the number of simultaneously transmittable PSFCHs or information related to the number of simultaneously receivable PSFCHs to a base station. a transmitting UE may transmit information related to the number of simultaneously transmittable PSFCHs or information related to the number of simultaneously receivable PSFCHs to a first receiving UE or a second receiving UE through a pre-configured signaling. For example, a pre-configured signaling may be signaling via PC5 RRC.

For example, when a first receiving UE transmits a plurality of first PSSCHs exceeding the number of simultaneously transmittable PSFCHs to a transmitting UE, a transmitting UE may perform first PSFCH transmissions corresponding to the number of simultaneously transmittable PSFCHs satisfying a pre-configured condition to a first receiving UE. For example, when a first receiving UE transmits a plurality of first PSSCHs exceeding the number of simultaneously transmittable PSFCHs to a transmitting UE, a transmitting UE may perform first PSFCH transmissions corresponding to the number of simultaneously transmittable PSFCHs related to a first PSSCH most recently received from the time of transmitting an HARQ feedback, to a first receiving UE. For example, when a first receiving UE transmits a plurality of first PSSCHs exceeding the number of simultaneously transmittable PSFCHs to a transmitting UE, a transmitting UE may perform first PSFCH transmissions corresponding to the number of simultaneously transmittable PSFCHs having a relatively high DMRS RSRP or RSRQ measurement value to a first receiving UE. For example, when a first receiving UE transmits a plurality of first PSSCHs exceeding the number of simultaneously transmittable PSFCHs to a transmitting UE, a transmitting UE may perform first PSFCH transmissions corresponding to the number of simultaneously transmittable PSFCHs related to a pre-configured cast type or a pre-configured groupcast option to a first receiving UE.

For example, a guarantee ratio or an omission ratio related to transmissions of a plurality of first PSFCHs may be configured for a transmitting UE based on at least one of a resource pool, a service type, a service priority, a cast type, a destination UE, a destination ID, a source ID or a QoS parameter. For example, a guarantee ratio may include a minimum guarantee ratio related to PSFCH transmission, a maximum guarantee ratio related to PSFCH transmission, and an average guarantee ratio related to PSFCH transmission. For example, an omission ratio may include a minimum omission ratio related to PSFCH transmission, a maximum omission ratio related to PSFCH transmission, and an average omission ratio related to PSFCH transmission.

For example, when the transmit power difference between a plurality of first PSFCH transmissions is greater than a pre-configured threshold, a transmitting UE may configure or distribute the transmit power equally for a plurality of first PSFCH transmissions. For example, when the transmit power difference between first PSFCH transmissions corresponding to the number of simultaneously transmittable PSFCHs is greater than a pre-configured threshold, a transmitting UE may configure or distribute the transmit power equally for the first PSFCHs being transmitted at the same time.

For example, the maximum number of transport blocks (TBs) that can be transmitted on PSCCH or PSSCH may be specifically configured based on a resource pool, a service type, a service priority, a cast type, a destination UE, a destination ID, a source ID, a QoS parameter, congestion level or a mode type.

Figure 17:
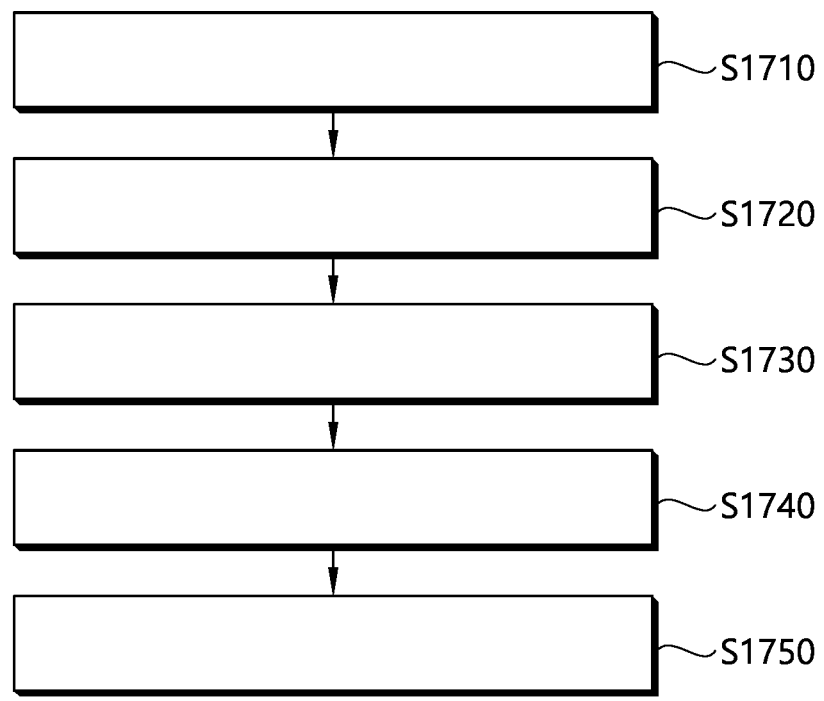
FIG. 17 shows a method for a first apparatus to perform sidelink communication based on priorities between transmissions of a plurality of first PSFCHs and receptions of a plurality of second PSFCHs, according to an embodiment of the present disclosure.

FIG. 17 shows a method for a first apparatus to perform sidelink communication based on priorities between transmissions of a plurality of first PSFCHs and receptions of a plurality of second PSFCHs, according to an embodiment of the present disclosure. The embodiment of FIG. 17 may be combined with various embodiments of the present disclosure.

Referring to FIG. 17, in step S1710, a first apparatus 100 may receive a plurality of first physical sidelink control channels (PSCCHs).

In step S1720, a first apparatus 100 may receive a plurality of first physical sidelink shared channels (PSSCHs) related to the plurality of first PSCCHs.

In step S1730, a first apparatus 100 may transmit a plurality of second PSCCHs.

In step S1740, a first apparatus 100 may transmit a plurality of second PSSCHs related to the plurality of second PSCCHs.

In step S1750, based on a first priority of transmissions of a plurality of first physical sidelink feedback channels (PSFCHs) related to the receptions of the plurality of first PSSCHs and a second priority of receptions of a plurality of second PSFCHs related to the transmissions of the plurality of second PSSCHs, a first apparatus 100 may perform any one related to a higher priority, of the transmissions of the plurality of first PSFCHs or the receptions of the plurality of second PSFCHs. For example, the plurality of priorities related to the transmissions of the plurality of first PSFCHs may be a plurality of priorities related to the receptions of the plurality of first PSSCHs. For example, a plurality of priorities related to the receptions of the plurality of first PSSCHs may be included in a plurality of sidelink control information (SCI) received through the plurality of first PSCCHs. For example, the plurality of priorities related to the receptions of the plurality of second PSFCHs may be a plurality of priorities related to the transmissions of the plurality of second PSSCHs. For example, a plurality of priorities related to the transmissions of the second PSSCHs may be included in a plurality of SCI transmitted through the plurality of second PSCCHs.

For example, the transmissions of the plurality of first PSFCHs related to the higher priority may be performed. For example, a first apparatus 100 may perform the transmissions of the plurality of first PSFCHs related to the higher priority. For example, the transmissions of the plurality of first PSFCHs may be performed based on the number of PSFCHs that the first apparatus 100 can transmit simultaneously. For example, the transmissions of the plurality of first PSFCHs may be performed as many as the number of the simultaneous transmissions, from a transmission of a first PSFCH of the first priority in descending order related to a priority. For example, a transmission of a first PSFCH corresponding to the number of simultaneous transmissions among the transmissions of the plurality of first PSFCHs may be a transmission of a first PSFCH with a transmit power difference less than or equal to a pre-configured threshold value, based on a parameter related to the transmission of the PSFCH of the first priority.

For example, the number of PSFCHs that can be transmitted simultaneously may be configured differently to the first apparatus 100 based on at least one of a service-related requirement, a QoS parameter, a service priority, a service type, a resource pool, a cast type, a destination UE, a destination ID, a source ID, a mode type, congestion level, a transmit power difference between PSFCH transmissions or separation distance on frequency resources between PSFCH transmissions.

For example, the number of PSFCHs that can be transmitted simultaneously may be reported to a base station from the first apparatus 100. For example, a first apparatus 100 may report the number of PSFCHs that can be transmitted simultaneously to a base station. For example, at least one of information on the number of PSFCHs that can be transmitted simultaneously, information on the capability related to PSFCH transmission of the first apparatus 100, or information on the capability related to PSFCH reception of the first apparatus 100 may be transmitted from the first apparatus 100 to a second apparatus 200 through a pre-defined signaling.

For example, based on that a second apparatus 200 transmits the plurality of first PSSCHs exceeding the number of PSFCHs that can be transmitted simultaneously to the first apparatus 100, transmissions of first PSFCHs that satisfy a pre-configured condition and correspond to the number of PSFCHs that can be transmitted simultaneously, among the transmissions of the plurality of first PSFCHs may be performed from the first apparatus 100 to the second apparatus 200.

For example, ratio guaranteeing PSFCH transmission related to the transmissions of the plurality of first PSFCHs may be configured to the first apparatus 100 based on at least one of a resource pool, a service type, a service priority, a cast type, a destination UE, a destination ID, a source ID, or a QoS parameter.

For example, the transmissions of the plurality of first PSFCHs related to the higher priority may be performed. For example, transmit power between the transmissions of the plurality of first PSFCHs may be equally distributed, based on that the transmit power difference between the transmissions of the plurality of first PSFCHs is greater than a pre-configured threshold value. For example, a first apparatus 100 may distribute transmit power between the transmissions of the plurality of first PSFCHs, based on that the transmit power difference between the transmissions of the plurality of first PSFCHs is greater than a pre-configured threshold value.

For example, the maximum number of transport blocks (TBs) that can be transmitted on the plurality of first PSCCHs or the plurality of first PSSCHs may be configured specifically based on a resource pool, a service type, a service priority, a cast type, a destination UE, a destination ID, a source ID, a QoS parameter, congestion level, or a mode type.

For example, based on that the transmissions of the plurality of first PSFCHs related to the higher priority are performed, a transmission of a first PSFCH that has the higher priority among the transmissions of the plurality of first PSFCHs may be performed preferentially. For example, the transmission of the plurality of first PSFCHs related to the higher priority may be performed based on at least one of that the transmit power difference between the transmissions of the plurality of first PSFCHs is less than or equal to a threshold value, that the separation distance in the frequency domain between the plurality of first PSFCHs is smaller than a pre-configured threshold value, or that the number of the transmissions of the plurality of first PSFCHs is less than or equal to a pre-configured threshold value.

The above-described embodiment may be applied to various apparatuses to be described below. For example, a processor 102 of a first apparatus 100 may control a transceiver 106 to receive a plurality of first physical sidelink control channels (PSCCHs). And, a processor 102 of a first apparatus 100 may control a transceiver 106 to receive a plurality of first physical sidelink shared channels (PSSCHs) related to the plurality of first PSCCHs. And, a processor 102 of a first apparatus 100 may control a transceiver 106 to transmit a plurality of second PSCCHs. And, a processor 102 of a first apparatus 100 may control a transceiver 106 to transmit a plurality of second PSSCHs related to the plurality of second PSCCHs. And, based on a first priority of transmissions of a plurality of first physical sidelink feedback channels (PSFCHs) related to the receptions of the plurality of first PSSCHs and a second priority of receptions of a plurality of second PSFCHs related to the transmissions of the plurality of second PSSCHs, a processor 102 of a first apparatus 100 may control a transceiver 106 to perform any one related to a higher priority, of the transmissions of the plurality of first PSFCHs or the receptions of the plurality of second PSFCHs.

According to an embodiment of the present disclosure, a first apparatus for performing wireless communication may be proposed. For example, the first apparatus may comprise: one or more memories storing instructions; one or more transceivers; and one or more processors connected to the one or more memories and the one or more transceivers. For example the one or more processors may execute the instructions to: receive a plurality of first physical sidelink control channels (PSCCHs); receive a plurality of first physical sidelink shared channels (PSSCHs) related to the plurality of first PSCCHs; transmit a plurality of second PSCCHs; transmit a plurality of second PSSCHs related to the plurality of second PSCCHs; and based on a first priority of transmissions of a plurality of first physical sidelink feedback channels (PSFCHs) related to the receptions of the plurality of first PSSCHs and a second priority of receptions of a plurality of second PSFCHs related to the transmissions of the plurality of second PSSCHs, perform any one related to a higher priority, of the transmissions of the plurality of first PSFCHs or the receptions of the plurality of second PSFCHs. For example, the first priority may be the highest priority among a plurality of priorities related to the transmissions of the plurality of first PSFCHs. For example, the second priority may be the highest priority among a plurality of priorities related to the receptions of the plurality of second PSFCHs. For example, the transmissions of the plurality of first PSFCHs and the receptions of the plurality of second PSFCHs may overlap in the time domain.

According to an embodiment of the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: receive a plurality of first physical sidelink control channels (PSCCHs); receive a plurality of first physical sidelink shared channels (PSSCHs) related to the plurality of first PSCCHs; transmit a plurality of second PSCCHs; transmit a plurality of second PSSCHs related to the plurality of second PSCCHs; and based on a first priority of transmissions of a plurality of first physical sidelink feedback channels (PSFCHs) related to the receptions of the plurality of first PSSCHs and a second priority of receptions of a plurality of second PSFCHs related to the transmissions of the plurality of second PSSCHs, perform any one related to a higher priority, of the transmissions of the plurality of first PSFCHs or the receptions of the plurality of second PSFCHs. For example, the first priority may be the highest priority among a plurality of priorities related to the transmissions of the plurality of first PSFCHs. For example, the second priority may be the highest priority among a plurality of priorities related to the receptions of the plurality of second PSFCHs. For example, the transmissions of the plurality of first PSFCHs and the receptions of the plurality of second PSFCHs may overlap in the time domain.

According to an embodiment of the present disclosure, a non-transitory computer-readable storage medium storing instructions may be proposed. For example, the instructions, when executed, may cause a first apparatus to: receive a plurality of first physical sidelink control channels (PSCCHs); receive a plurality of first physical sidelink shared channels (PSSCHs) related to the plurality of first PSCCHs; transmit a plurality of second PSCCHs; transmit a plurality of second PSSCHs related to the plurality of second PSCCHs; and based on a first priority of transmissions of a plurality of first physical sidelink feedback channels (PSFCHs) related to the receptions of the plurality of first PSSCHs and a second priority of receptions of a plurality of second PSFCHs related to the transmissions of the plurality of second PSSCHs, perform any one related to a higher priority, of the transmissions of the plurality of first PSFCHs or the receptions of the plurality of second PSFCHs. For example, the first priority may be the highest priority among a plurality of priorities related to the transmissions of the plurality of first PSFCHs. For example, the second priority may be the highest priority among a plurality of priorities related to the receptions of the plurality of second PSFCHs. For example, the transmissions of the plurality of first PSFCHs and the receptions of the plurality of second PSFCHs may overlap in the time domain.

Figure 18:
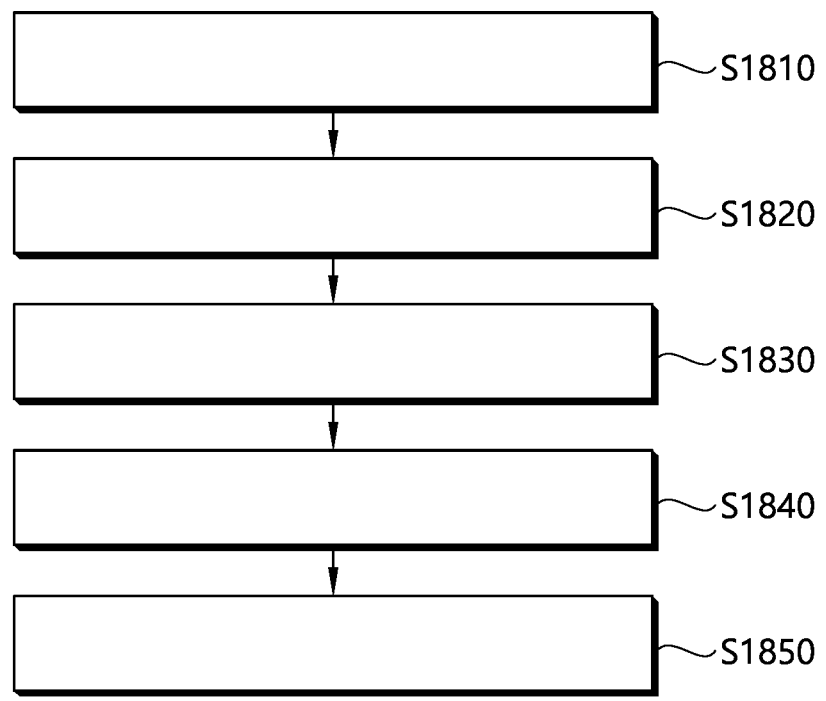
FIG. 18 shows a method for a second apparatus to perform sidelink communication based on priorities between transmissions of a plurality of first PSFCHs and receptions of a plurality of second PSFCHs, according to an embodiment of the present disclosure.

FIG. 18 shows a method for a second apparatus to perform sidelink communication based on priorities between transmissions of a plurality of first PSFCHs and receptions of a plurality of second PSFCHs, according to an embodiment of the present disclosure. FIG. 18 may be combined with various embodiments of the present disclosure.

Referring to FIG. 18, in step S1810, a second apparatus 200 may transmit a plurality of first physical sidelink control channels (PSCCHs) to a first apparatus 100.

In step S1820, a second apparatus 200 may transmit a plurality of first physical sidelink shared channels (PSSCHs) related to the plurality of first PSCCHs to the first apparatus 100.

In step S1830, a second apparatus 200 may receive a plurality of second PSCCHs from the first apparatus 100.

In step S1840, a second apparatus 200 may receive a plurality of second PSSCHs related to the plurality of second PSCCHs from the first apparatus 100.

In step S1850, based on a first priority of receptions of a plurality of first physical sidelink feedback channels (PSFCHs) related to the transmissions of the plurality of first PSSCHs and a second priority of a plurality of second PSFCH and a second priority of transmissions of a plurality second PSFCHs related to receptions of the plurality of second PSSCHs, a second apparatus 200 may perform any one related to a higher priority, of the receptions of the plurality of first PSFCHs or the transmissions of the plurality of second PSFCHs.

For example, the plurality of priorities related to the receptions of the plurality of first PSFCHs may be a plurality of priorities related to the transmissions of the plurality of first PSSCHs. For example, a plurality of priorities related to the transmissions of the plurality of first PSSCHs may be included in a plurality of sidelink control information (SCI) transmitted through the plurality of first PSCCHs. For example, the plurality of priorities related to the transmissions of the plurality of second PSFCHs may be a plurality of priorities related to the receptions of the plurality of second PSSCHs. For example, a plurality of priorities related to the receptions of the second PSSCHs may be included in a plurality of SCI received through the plurality of second PSCCHs.

For example, the receptions of the plurality of first PSFCHs related to the higher priority may be performed. For example, a second apparatus 200 may perform the receptions of the plurality of first PSFCHs related to the higher priority. For example, the receptions of the plurality of first PSFCHs may be performed based on the number of PSFCHs that the second apparatus 200 can receive simultaneously. For example, the receptions of the plurality of first PSFCHs may be performed as many as the number of the simultaneous receptions, from a reception of a first PSFCH of the first priority in descending order related to a priority. For example, a reception of a first PSFCH corresponding to the number of simultaneous receptions among the receptions of the plurality of first PSFCHs may be a reception of a first PSFCH with a transmit power difference less than or equal to a pre-configured threshold value, based on a parameter related to the reception of the PSFCH of the first priority.

For example, the number of PSFCHs that can be received simultaneously may be configured differently to the second apparatus 200 based on at least one of a service-related requirement, a QoS parameter, a service priority, a service type, a resource pool, a cast type, a destination UE, a destination ID, a source ID, a mode type, congestion level, a reception power difference between PSFCH receptions or separation distance on frequency resources between PSFCH receptions.

For example, the number of PSFCHs that can be received simultaneously may be reported to a base station from the second apparatus 200. For example, a second apparatus 200 may report the number of PSFCHs that can be received simultaneously to a base station. For example, at least one of information on the number of PSFCHs that can be transmitted simultaneously, information on the capability related to PSFCH transmission of the second apparatus 200, or information on the capability related to PSFCH reception of the second apparatus 200 may be transmitted from the second apparatus 200 to a first apparatus 100 through a pre-defined signaling.

For example, based on that a first apparatus 100 transmits the plurality of first PSSCHs exceeding the number of PSFCHs that can be received simultaneously to the second apparatus 200, receptions of first PSFCHs that satisfy a pre-configured condition and correspond to the number of PSFCHs that can be received simultaneously, among the receptions of the plurality of first PSFCHs may be performed.

For example, ratio guaranteeing PSFCH transmission related to the receptions of the plurality of first PSFCHs may be configured to the second apparatus 200 based on at least one of a resource pool, a service type, a service priority, a cast type, a destination UE, a destination ID, a source ID, or a QoS parameter.

For example, the receptions of the plurality of first PSFCHs related to the higher priority may be performed. For example, reception power between the receptions of the plurality of first PSFCHs may be equally distributed, based on that the reception power difference between the receptions of the plurality of first PSFCHs is greater than a pre-configured threshold value. For example, a second apparatus 200 may distribute reception power between the receptions of the plurality of first PSFCHs, based on that the reception power difference between the receptions of the plurality of first PSFCHs is greater than a pre-configured threshold value.

For example, based on that the receptions of the plurality of first PSFCHs related to the higher priority are performed, a reception of a first PSFCH that has the higher priority among the receptions of the plurality of first PSFCHs may be performed preferentially. For example, the reception of the plurality of first PSFCHs related to the higher priority may be performed based on at least one of that the reception power difference between the receptions of the plurality of first PSFCHs is less than or equal to a threshold value, that the separation distance in the frequency domain between the plurality of first PSFCHs is smaller than a pre-configured threshold value, or that the number of the receptions of the plurality of first PSFCHs is less than or equal to a pre-configured threshold value.

The above-described embodiment may be applied to various devices to be described below. For example, a processor 202 of a second apparatus 200 may control a transceiver 206 to transmit a plurality of first physical sidelink control channels (PSCCHs) to a first apparatus 100. And, a processor 202 of a second apparatus 200 may control a transceiver 206 to transmit a plurality of first physical sidelink shared channels (PSSCHs) related to the plurality of first PSCCHs to the first apparatus 100. And, a processor 202 of a second apparatus 200 may control a transceiver 206 to receive a plurality of second PSCCHs from the first apparatus 100. And, a processor 202 of a second apparatus 200 may control a transceiver 206 to receive a plurality of second PSSCHs related to the plurality of second PSCCHs from the first apparatus 100. And, based on a first priority of receptions of a plurality of first physical sidelink feedback channels (PSFCHs) related to the transmissions of the plurality of first PSSCHs and a second priority of a plurality of second PSFCH and a second priority of transmissions of a plurality second PSFCHs related to receptions of the plurality of second PSSCHs, a processor 202 of a second apparatus 200 may control a transceiver 206 to perform any one related to a higher priority, of the receptions of the plurality of first PSFCHs or the transmissions of the plurality of second PSFCHs.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers. For example, the one or more processors may execute the instructions to: transmit a plurality of first physical sidelink control channels (PSCCHs) to a first apparatus; transmit a plurality of first physical sidelink shared channels (PSSCHs) related to the plurality of first PSCCHs to the first apparatus; receive a plurality of second PSCCHs from the first apparatus; receive a plurality of second PSSCHs related to the plurality of second PSCCHs from the first apparatus; and based on a first priority of receptions of a plurality of first physical sidelink feedback channels (PSFCHs) related to the transmissions of the plurality of first PSSCHs and a second priority of a plurality of second PSFCH and a second priority of transmissions of a plurality second PSFCHs related to receptions of the plurality of second PSSCHs, perform any one related to a higher priority, of the receptions of the plurality of first PSFCHs or the transmissions of the plurality of second PSFCHs, wherein the first priority is the highest priority among a plurality of priorities related to the receptions of the plurality of first PSFCHs, wherein the second priority is the highest priority among a plurality of priorities related to the transmissions of the plurality of second PSFCHs, and wherein the receptions of the plurality of first PSFCHs and the transmissions of the plurality of second PSFCHs overlap in the time domain.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
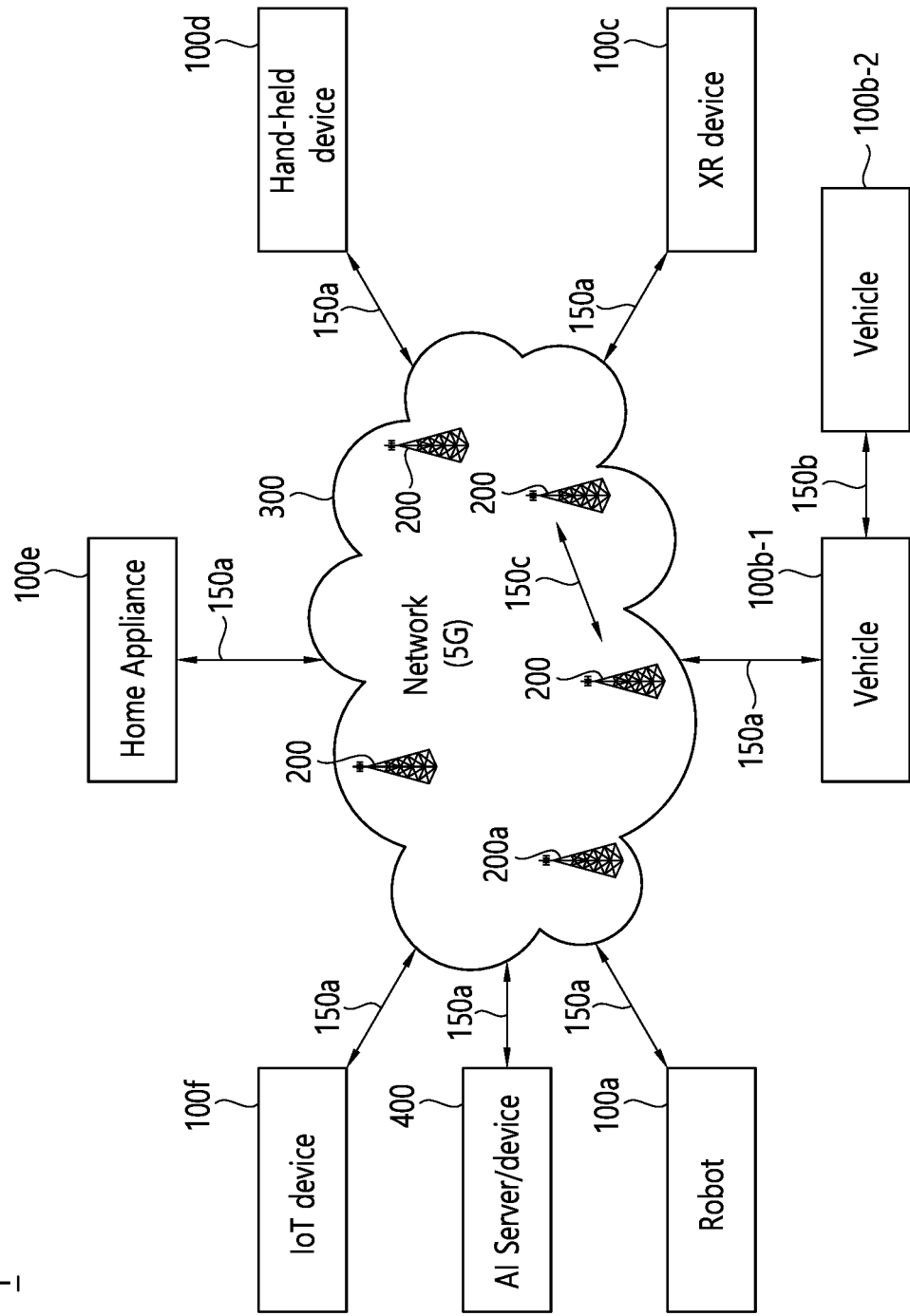
FIG. 19 shows a communication system 1, in accordance with an embodiment of the present disclosure.

FIG. 19 shows a communication system 1, in accordance with an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
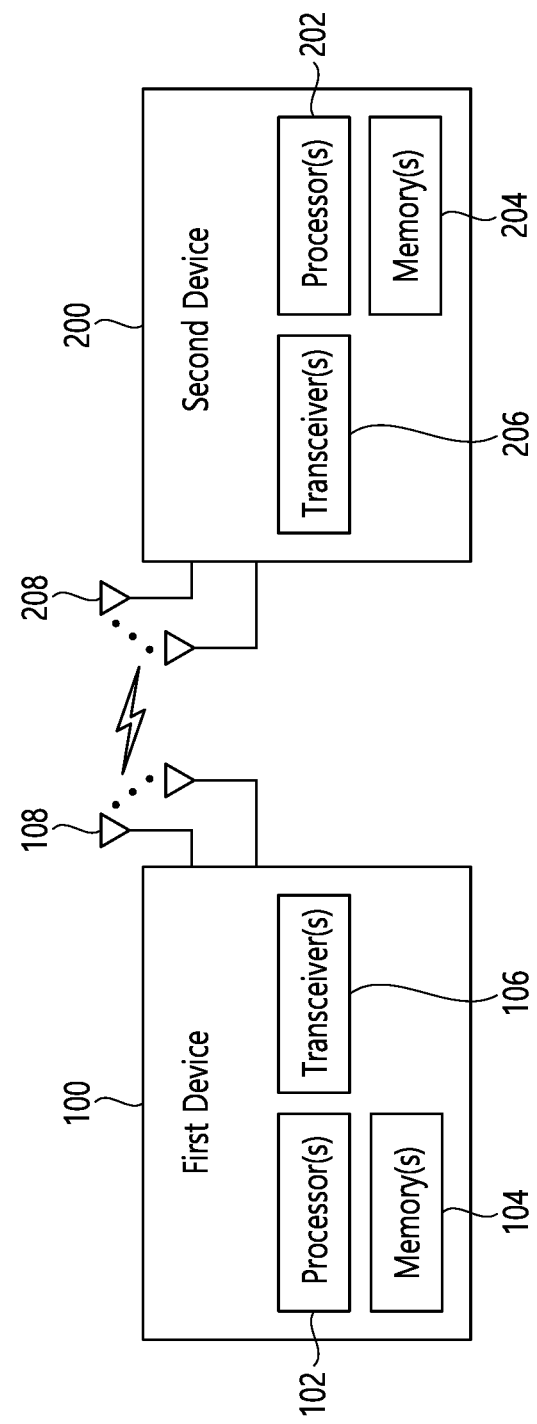
FIG. 20 shows wireless devices, in accordance with an embodiment of the present disclosure.

FIG. 20 shows wireless devices, in accordance with an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
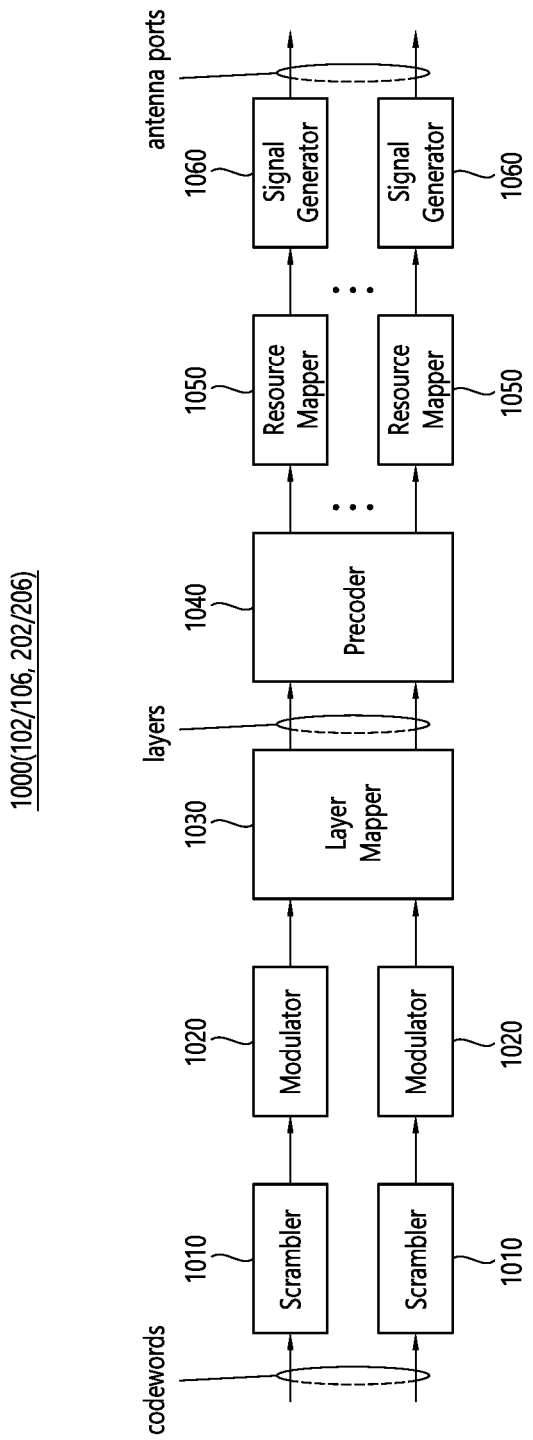
FIG. 21 shows a signal process circuit for a transmission signal, in accordance with an embodiment of the present disclosure.

FIG. 21 shows a signal process circuit for a transmission signal, in accordance with an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
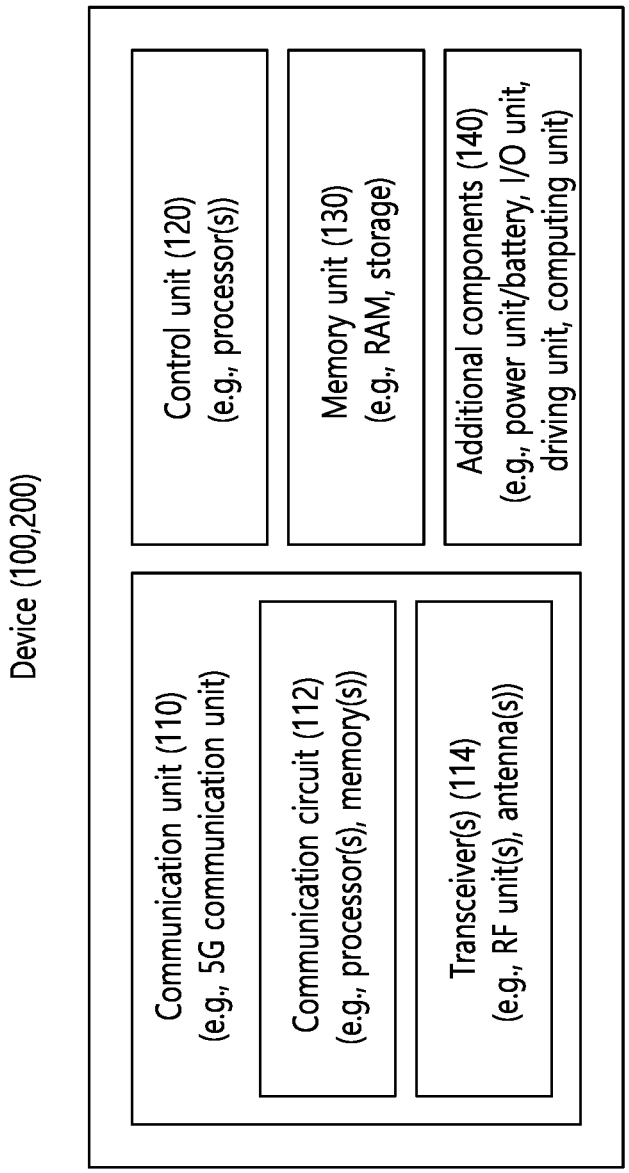
FIG. 22 shows a wireless device, in accordance with an embodiment of the present disclosure.

FIG. 22 shows another example of a wireless device, in accordance with an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
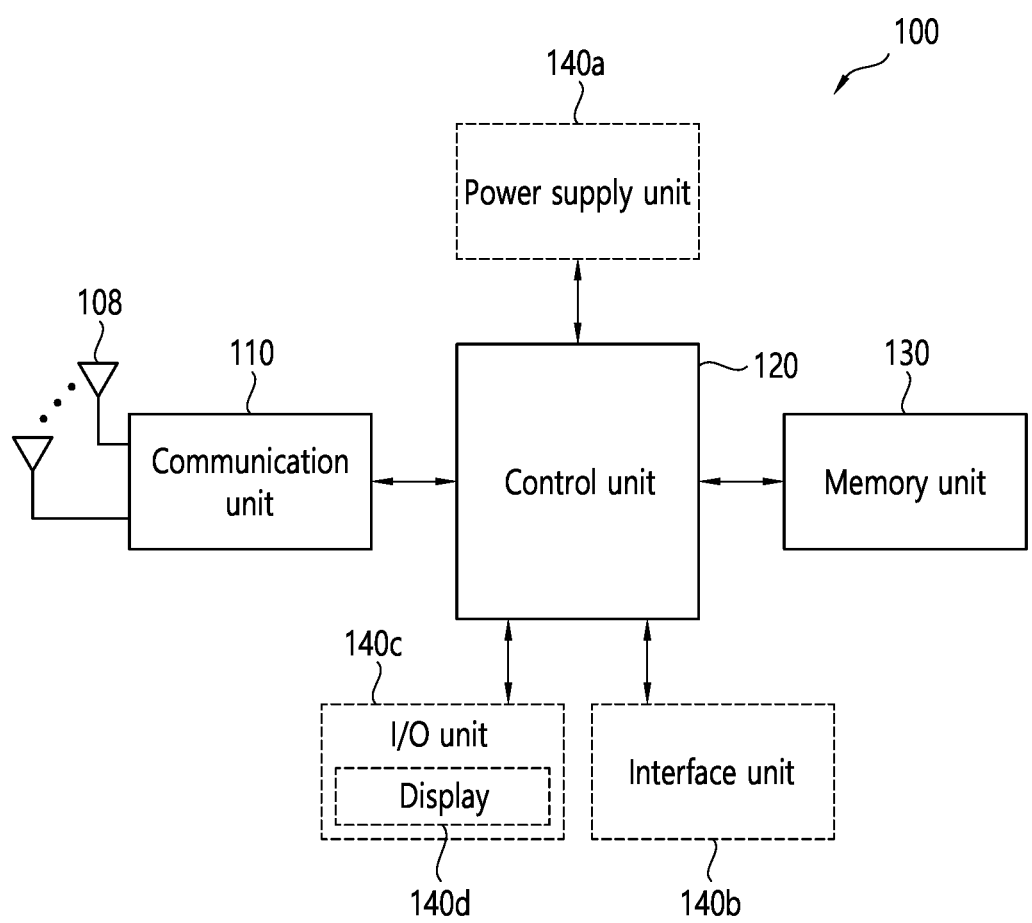
FIG. 23 shows a hand-held device, in accordance with an embodiment of the present disclosure.

FIG. 23 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 24:
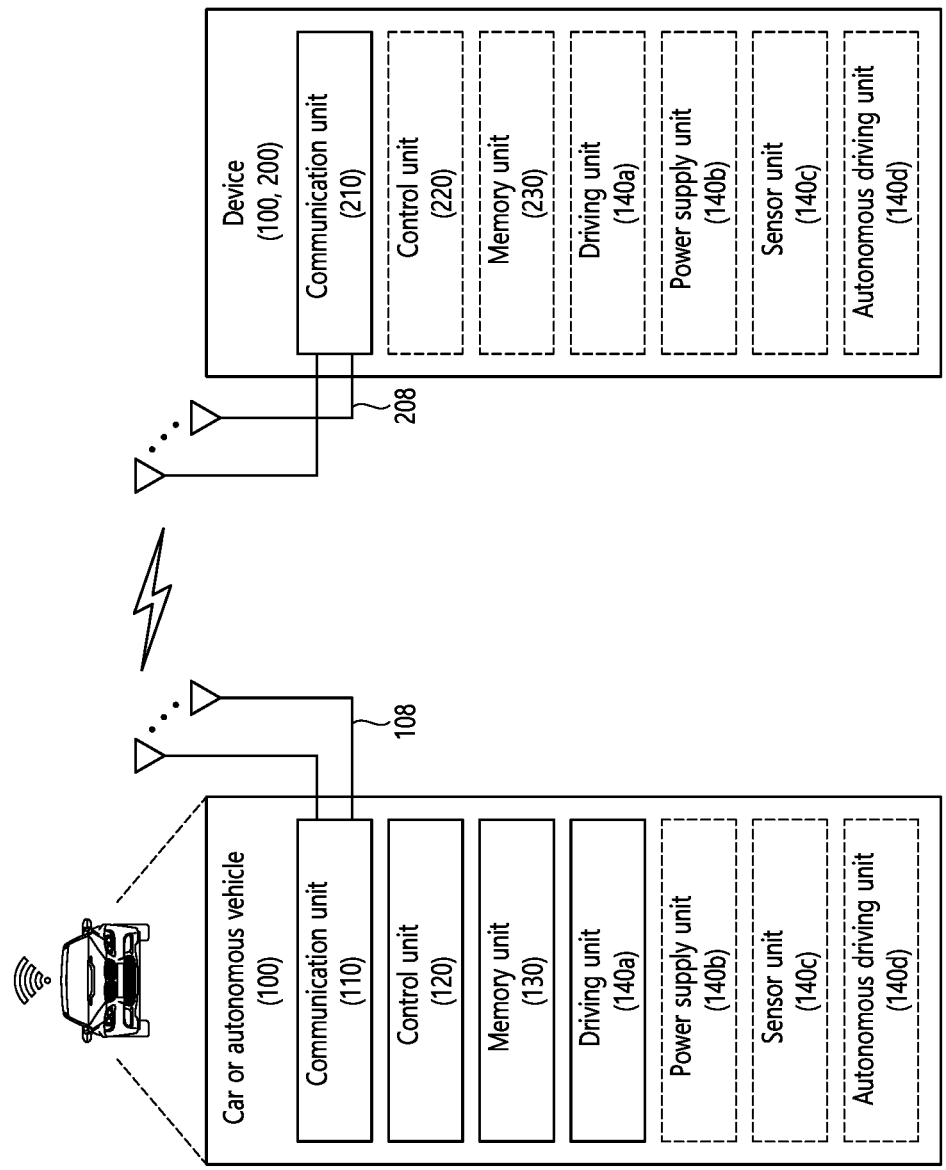
FIG. 24 shows a car or an autonomous vehicle, in accordance with an embodiment of the present disclosure.

FIG. 24 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as apart of the communication unit 110. The blocks 110/130/140*a* to 140*d* correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, wireless communication, the method comprising:
    receiving a plurality of first physical sidelink control channels (PSCCHs);
    receiving a plurality of first physical sidelink shared channels (PSSCHs) related to the plurality of first PSCCHs;
    transmitting a plurality of second PSCCHs;
    transmitting a plurality of second PSSCHs related to the plurality of second PSCCHs; and
    transmitting a first physical sidelink feedback channel (PSFCH), among a plurality of first PSFCHs related, respectively, to the plurality of received first PSSCHs, or receiving a second PSFCH, among a plurality of second PSFCHs related, respectively, to the plurality of transmitted second PSSCHs, based on an overlap in a time for transmitting a plurality of first PSFCHs related, respectively, to the plurality of received first PSSCHs and a time for receiving a plurality of second PSFCHs related, respectively, to the plurality of transmitted second PSSCHs,
    wherein each of the plurality of first PSFCHs has a corresponding priority and each of the plurality of second PSFCHs has a corresponding priority, and
    wherein transmitting the first PSFCH or receiving the second PSFCH is based on the priority of the first PSFCH and the priority of the second PSFCH.

2. The method of claim 1,
    wherein the priorities corresponding to the plurality of first PSFCHs are related to priorities corresponding to the plurality of received first PSSCHs, wherein the priorities corresponding to the plurality of received first PSSCHs are included in a plurality of sidelink control information (SCI) received through the plurality of first PSCCHs, wherein the priorities corresponding to the plurality of second PSFCHs are related to priorities corresponding to the plurality of second transmitted PSSCHs, and wherein the priorities corresponding to the plurality of transmitted second PSSCHs are included in a plurality of SCI transmitted through the plurality of second PSCCHs.

3. The method of claim 1 further comprising:

transmitting at least two first PSFCHs, among the plurality of first PSFCHs, wherein the transmission of the at least two first PSFCHs is based on those first PSFCHs having at least the highest two priorities, and based on a number of PSFCHs that the first apparatus can transmit simultaneously.

4. The method of claim 3, wherein the transmission of the first PSFCH among the plurality of first PSFCHs is a transmission with a transmit power difference less than or equal to a pre-configured threshold value, based on a parameter related to the transmission of the PSFCH.

5. The method of claim 3, wherein the number of first PSFCHs that can be transmitted simultaneously is configured differently to the first apparatus based on at least one of a service-related requirement, a QoS parameter, a service priority, a service type, a resource pool, a cast type, a destination UE, a destination ID, a source ID, a mode type, congestion level, a transmit power difference between PSFCH transmissions or separation distance on frequency resources between PSFCH transmissions.

6. The method of claim 3, wherein the number of first PSFCHs that can be transmitted simultaneously is reported to a base station from the first apparatus.

7. The method of claim 3, wherein at least one of information on the number of first PSFCHs that can be transmitted simultaneously, information on a capability related to PSFCH transmission of the first apparatus, or information on a capability related to PSFCH reception by the first apparatus is transmitted from the first apparatus to a second apparatus through pre-defined signaling.

8. The method of claim 6, wherein based on that a second apparatus transmits a plurality of first PSSCHs exceeding the number of PSFCHs that can be simultaneously received by the first apparatus, transmission of the at least two first PSFCHs that satisfy a pre-configured condition and correspond to the number of PSFCHs that can be transmitted simultaneously is performed by the first apparatus to the second apparatus.

9. The method of claim 1, wherein a ratio guaranteeing PSFCH transmission related to the transmission of first PSFCHs is configured to the first apparatus based on at least one of a resource pool, a service type, a service priority, a cast type, a destination UE, a destination ID, a source ID, or a QoS parameter.

10. The method of claim 3, wherein transmit power between the transmission of the at least two first PSFCHs is equally distributed, based on that the transmit power difference between the transmission of the at least two first PSFCHs is greater than a pre-configured threshold value.

11. The method of claim 1, wherein a maximum number of transport blocks (TBs) that can be transmitted on the plurality of first PSCCHs or the plurality of first PSSCHs is configured specifically based on a resource pool, a service type, a service priority, a cast type, a destination UE, a destination ID, a source ID, a QoS parameter, congestion level, or a mode type.

12. The method of claim 3, wherein the transmission of the at least two first PSFCHs is further based on at least one of the transmit power difference between the transmission of the at least two first PSFCHs is less than or equal to a threshold value, the separation distance in the frequency domain between the at least two first PSFCHs is smaller than a pre-configured threshold value, or the number of transmitted first PSFCHs is less than or equal to a pre-configured threshold value.

13. A first apparatus for performing wireless communication, the first apparatus comprising:

one or more memories storing instructions;

one or more transceivers; and one or more processors connected to the one or more memories and the one or more transceivers, wherein the one or more processors execute the instructions to:

receive a plurality of first physical sidelink control channels (PSCCHs);

receive a plurality of first physical sidelink shared channels (PS SCHs) related to the plurality of first PSCCHs;

transmit a plurality of second PSCCHs;

transmit a plurality of second PSSCHs related to the plurality of second PSCCHs; and transmitting a first physical sidelink feedback channel (PSFCH), among a plurality of first PSFCHs related, respectively, to the plurality of received first PSSCHs, or receiving a second PSFCH, among a plurality of second PSFCHs related, respectively, to the plurality of transmitted second PSSCHs, based on an overlap in a time for transmitting a plurality of first PSFCHs related, respectively, to the plurality of received first PS SCHs and a time for receiving a plurality of second PSFCHs related, respectively, to the plurality of transmitted second PSSCHs, wherein each of the plurality of first PSFCHs has a corresponding priority and each of the plurality of second PSFCHs has a corresponding priority, and wherein transmitting the first PSFCH or receiving the second PSFCH is based on the priority of the first PSFCH and the priority of the second PSFCH.

14. An apparatus configured to control a first user equipment (UE), the apparatus comprising:

one or more processors; and one or more memories operably connectable to the one or more processors and storing instructions, wherein the one or more processors execute the instructions to:

receive a plurality of first physical sidelink control channels (PSCCHs);

receive a plurality of first physical sidelink shared channels (PS SCHs) related to the plurality of first PSCCHs;

transmit a plurality of second PSCCHs;

transmit a plurality of second PSSCHs related to the plurality of second PSCCHs; and transmitting a first physical sidelink feedback channel (PSFCH), among a plurality of first PSFCHs related, respectively, to the plurality of received first PSSCHs, or receiving a second PSFCH, among a plurality of second PSFCHs related, respectively, to the plurality of transmitted second PSSCHs, based on an overlap in a time for transmitting a plurality of first PSFCHs related, respectively, to the plurality of received first PS SCHs and a time for receiving a plurality of second PSFCHs related, respectively, to the plurality of transmitted second PSSCHs, wherein each of the plurality of first PSFCHs has a corresponding priority and each of the plurality of second PSFCHs has a corresponding priority, and wherein transmitting the first PSFCH or receiving the second PSFCH is based on the priority of the first PSFCH and the priority of the second PSFCH.

15. The method of claim 3, wherein transmitting at least two first PSFCHs comprises:

transmitting a number of first PSFCHs in order of descending priority, wherein the number of transmitted first PSFCHs is equivalent to a number of transmissions the first apparatus can simultaneously transmit.

* * * * *